(12) United States Patent
Urakami

(10) Patent No.: US 7,824,472 B2
(45) Date of Patent: Nov. 2, 2010

(54) METHOD AND APPARATUS FOR PRESSURE SWING ADSORPTION

(75) Inventor: Tatsushi Urakami, Kawasaki (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 303 days.

(21) Appl. No.: 12/084,622

(22) PCT Filed: Feb. 23, 2006

(86) PCT No.: PCT/JP2006/303306
§ 371 (c)(1),
(2), (4) Date: May 7, 2008

(87) PCT Pub. No.: WO2007/055035
PCT Pub. Date: May 18, 2007

(65) Prior Publication Data
US 2009/0107331 A1    Apr. 30, 2009

(30) Foreign Application Priority Data
Nov. 14, 2005  (JP)  ............................. 2005-328582

(51) Int. Cl.
*B01D 59/26*    (2006.01)

(52) U.S. Cl. ...................... 95/96; 95/86; 95/98; 95/100; 95/103; 95/127; 95/130; 96/103

(58) Field of Classification Search ...................... 95/86, 95/96, 98, 100, 103, 127, 130; 96/103
See application file for complete search history.

(56) References Cited
U.S. PATENT DOCUMENTS
3,788,036 A * 1/1974 Lee et al. ...................... 95/101
(Continued)

FOREIGN PATENT DOCUMENTS
JP    58-159830    9/1983
(Continued)

OTHER PUBLICATIONS
DERWENT Abstract of JP 10-272332 A (Nippon Sanso Corp.), Oct. 13, 1998.*
(Continued)

*Primary Examiner*—Robert J Hill, Jr.
*Assistant Examiner*—Christopher P Jones
(74) *Attorney, Agent, or Firm*—Nixon & Vanderhye P.C.

(57) ABSTRACT

In order to provide a new PSA method which can concentrate simultaneously a strong adsorbate such as xenon and a weak adsorbate such as nitrogen in a high concentration with a high recovery percentage when highly valuable gas such as xenon and krypton contained in the exhaust gas from a semiconductor manufacturing equipment, etc. is recovered in a high concentration with a high recovery percentage, the present invention provides a new PSA method in which the method uses a separation apparatus comprising a lower column and a upper column which are filled with an adsorbent, a material gas storage tank for storing the material gas to be introduced into the lower column, a strong adsorbate storage tank for storing a main component which is easily adsorbed by the adsorbent, and a compressor, and the strong adsorbate which is easily adsorbed by the adsorbent and the weak adsorbate which is not readily adsorbed by the adsorbent are recovered, wherein the method comprises an (a) adsorption step, (b) rinse step, (c) low column depressurization step, (d) upper column depressurization step, and (e) purge step sequentially repeated based on a predetermined sequence.

11 Claims, 13 Drawing Sheets

U.S. PATENT DOCUMENTS

| | | | |
|---|---|---|---|
| 4,190,424 A * | 2/1980 | Armond et al. | 95/98 |
| 4,359,328 A | 11/1982 | Wilson | |
| 4,599,094 A | 7/1986 | Werner et al. | |
| 4,661,125 A * | 4/1987 | Haruna et al. | 95/102 |
| 4,732,578 A | 3/1988 | Benkmann | |
| 4,810,265 A | 3/1989 | Lagree et al. | |
| 4,917,710 A * | 4/1990 | Haruna et al. | 95/102 |
| 5,085,674 A | 2/1992 | Leavitt | |
| 5,104,426 A * | 4/1992 | Yamada et al. | 95/11 |
| 5,203,888 A * | 4/1993 | Maurer | 95/101 |
| 5,518,526 A * | 5/1996 | Baksh et al. | 95/100 |
| 5,833,737 A * | 11/1998 | Tamura et al. | 95/98 |
| 6,500,235 B2 | 12/2002 | Zhong et al. | |
| 6,527,830 B1 | 3/2003 | Neu et al. | |
| 6,923,844 B2 * | 8/2005 | Urakami et al. | 95/12 |
| 7,041,155 B1 * | 5/2006 | Kim et al. | 95/130 |
| 7,300,497 B2 * | 11/2007 | Urakami et al. | 95/98 |
| 7,722,698 B2 * | 5/2010 | Thompson et al. | 95/8 |
| 2002/0134240 A1 * | 9/2002 | Zhong et al. | 95/96 |
| 2003/0000385 A1 * | 1/2003 | Kawai et al. | 95/96 |
| 2005/0000355 A1 * | 1/2005 | Urakami et al. | 95/96 |
| 2005/0199122 A1 * | 9/2005 | Urakami et al. | 95/96 |

FOREIGN PATENT DOCUMENTS

| | | |
|---|---|---|
| JP | 60-155501 | 8/1985 |
| JP | 62-136223 | 6/1987 |
| JP | 1-104325 | 4/1989 |
| JP | 1-184016 | 7/1989 |
| JP | 1-257113 | 10/1989 |
| JP | 6-296819 | 10/1994 |
| JP | 10-272332 | 10/1998 |
| JP | 2001-269532 | 10/2001 |
| JP | 2002-126435 | 5/2002 |
| JP | 2005-246137 | 9/2005 |

OTHER PUBLICATIONS

International Search Report for PCT/JP2006/303306 Dated May 16, 2006.

Japanese Office Action dated Dec. 1, 2009 in JP 2004-247396 with English translation of Notice of Reasons for Rejection.

* cited by examiner

METHOD AND APPARATUS FOR PRESSURE SWING ADSORPTION

TECHNICAL FIELD

The present invention relates to a method and an apparatus for recovering highly valuable gas, such as krypton and xenon, from a gas mixture containing highly valuable gas in a high concentration with a high recovery percentage. Specifically, the present invention relates to a method and an apparatus for pressure swing adsorption which recovers highly valuable gas from exhaust gas discharged from semiconductor manufacturing equipment, such as a plasma sputtering device, a plasma oxidation device, a plasma nitridation device, a plasma CVD device, and a reactive ion etching device, and manufacturing equipment for display device (liquid crystal display etc.).

This application is the U.S. national phase of International Application No. PCT/JP2006/303306 filed 23 Feb. 2006 which designated the U.S. and claims priority to Japanese Patent Application No. 2005-328582, filed Nov. 14, 2005, the contents of each of which are incorporated herein by reference.

BACKGROUND ART

In the manufacturing for semiconductor products, such as semiconductor integrated circuits, liquid crystal panels, solar battery panels, and magnetic disks, plasma which is generated by high frequency discharge in rare gas atmosphere is used in various steps. In the processes, argon has been used conventionally.

However, krypton and xenon have attracted attention, for the purpose of performing an advanced manufacturing process.

However, krypton and xenon are extremely expensive gases because of the abundance ratio in the atmosphere and the complexity of the separation process. Discharging into the atmosphere after using as an atmospheric gas is problematic in that the cost increases remarkably. For the process using these expensive gases to be economical, it is extremely important to recover the rare gas used with a recovery percentage of 99% or greater and use cyclically. In order to reuse the recovered rare gas, a concentration of 99% or greater is required.

The exhaust gas from the manufacturing equipment for semiconductor products and displays, etc. mainly contains an atmospheric gas and a purge gas introduced into the manufacturing equipment during the evacuation. The exhaust gas further contains gas introduced depending on the manufacturing method for semiconductor products. For example, when an oxide film is produced, the exhaust gas further contains oxygen. When a nitride film is produced, the exhaust gas further contains nitrogen, and hydrogen or ammonia. When a plasma CVD is performed, it further contains metal hydride gas. When a reactive ion etching is performed, it further contains halogenated carbon hydride gas, helium, and nitrogen. In addition, when a plasma process is performed, it further contains moisture, carbon dioxide, hydrogen, NOx, and carbon hydride, etc. as by-products.

In general, a pressure swing adsorption separation (PSA) method is known as a method for recovering a target component from mixed gas. As a typical device using a pressure swing adsorption separation method, there are an oxygen PSA device and a nitrogen PSA device. In these typical PSA devices, a strong adsorbate is removed, and a weak adsorbate is recovered as a product. In an oxygen PSA device, nitrogen which is a strong adsorbate is removed and oxygen which is a weak adsorbate is recovered using zeolite as an adsorbent. In a nitrogen PSA device, oxygen which is a strong adsorbate is removed and nitrogen which is a weak adsorbate is recovered using an adsorbent such as CMS (carbon molecular sieve).

A target component (weak adsorbate) can be concentrated in a high concentration in these typical PSA devices. However, the weak adsorbate which remains in spaces made by the adsorbent particles or by the adsorbent as a co-adsorbed ingredient is exhausted with the strong adsorbate in a desorption step. Therefore, a target component (weak adsorbate) cannot be recovered with a high recovery percentage. In order to recover the target component in a high concentration with a high recovery percentage, it is necessary not only to condense the target component, but also to decrease the amount of the target component contained in the exhaust gas as much as possible. In other words, when the mix gas contains two components, a gas separating method which can recover each component in a high concentration with a high recovery is required.

The PSA method using a counter current purge gas is disclosed as a method for recovering plural components from a mixture gas in U.S. Pat. No. 4,599,094 of Werner et al.

The PSA method of Werner et al. recovers a strong adsorbate and a weak adsorbate in a material gas as a product at the same time. For example, when the material gas is air, nitrogen which is a strong adsorbate and oxygen which is a weak adsorbate are both recovered as a product. Specifically, air is supplied with high pressure to the bottom of an adsorption column, and nitrogen which is a strong adsorbate is adsorbed. Oxygen which is a weak adsorbate is led out from the upper portion of the adsorption column. Supplying of air is stopped before an adsorption band of air reaches the top portion of the adsorption column. Then, high concentrated nitrogen gas is supplied from the bottom portion of the adsorption column as a counter current purge gas. The counter current purge gas is supplied until an adsorption band of the high concentrated nitrogen gas reaches above or below the adsorption band of air. In this period, leading out of oxygen from the top of the adsorption column is continued. The adsorption column is saturated with nitrogen which is a strong adsorbate by the counter current purge gas. A part of the oxygen led out from the top portion of the adsorption column is recovered as a product, and the remaining oxygen is used as a counter current purge gas. The nitrogen adsorbed by the adsorbent is stored in a nitrogen storage tank by contacting with oxygen as counter current purge gas under reduced pressure conditions. A part of the nitrogen recovered in the nitrogen storage tank is used as a product, and the remaining nitrogen is used as a counter current purge gas. U.S. Pat. No. 4,599,094 discloses that a nitrogen product having a concentration of 99.8% or greater can be recovered, and an oxygen product having a concentration in a range from 90 to 93.6% can also be recovered.

U.S. Pat. No. 4,810,265 of Lagree et al. discloses a PSA method which is a revised version of the PSA disclosed in U.S. Pat. No. 4,599,094 of Werner et al. U.S. Pat. No. 6,527,830 of Neu et al. discloses a PSA method in which an equalization method and operation conditions are improved.

These methods can improve the nitrogen concentration and the nitrogen recovery percentage which is a strong adsorbate. However, it is impossible to recover oxygen which is a weak adsorbate in the same high concentration as that of nitrogen.

As a method for recovering plural components containing both a strong adsorbate and a weak adsorbate in a high concentration from a mixture gas, a Duplex PSA method is disclosed in U.S. Pat. No. 5,085,674 of Leavitt and U.S. Pat. No. 6,500,235 of Zhong et al.

The Duplex PSA method is characterized in that a material gas is supplied into the middle portion of an adsorption column, a typical PSA method (PSA method for concentrating a weak adsorbate) is performed at the top portion of the adsorption column, and an inverse PSA method (PSA method for concentrating a strong adsorbate) disclosed in U.S. Pat. No. 4,359,328 of Wilson is performed at the bottom portion of the adsorption column.

In the Duplex PSA method, a weak adsorbate which is obtained from the top portion of the adsorption column under high pressure conditions is depressurized and introduced into another adsorption column under low pressure conditions. A strong adsorbate which is obtained from the bottom portion of the adsorption column under low pressure conditions is pressurized, and introduced into the adsorption column under high pressure. That is, gas is cycled between the adsorption column under high pressure and the adsorption column under low pressure. Thereby, the weak adsorbate is concentrated in the upper portion of the adsorption column, and the strong adsorbate is concentrated in the bottom portion of the adsorption column.

The material gas is introduced into the middle portion of the adsorption column. A part of the reflux gas in the upper portion of the adsorption column is recovered as a product of a weak adsorbate. A part of the reflux gas in the bottom portion of the adsorption column is recovered as a product of a strong adsorbate. The Duplex PSA method can recover both a strong adsorbate and a weak adsorbate in a high concentration with a high recovery percentage.

However, when the material gas contains hydrogen or helium, the Duplex PSA method has a problem in that the product of a strong adsorbate contains hydrogen or helium because hydrogen and helium are the weakest adsorbates which are rarely adsorbed by an adsorbent.

In addition to these PSA methods, a PSA method combining an equilibrium separation type PSA method and a speed separation type PSA method is disclosed in Japanese Patent Application, First Publication No. 2002-126435 of Kawai et al. as a method for recovery of a target component with a high concentration and a high recovery percentage.

The PSA method can recover two components as a product by combining the two typical PSA methods (a weak adsorbate is concentrated). For example, when a mixture gas containing krypton and nitrogen is used as a material gas, nitrogen which is a weak adsorbate is recovered by the equilibrium separation type PSA method in which krypton is a strong adsorbate and nitrogen is a weak adsorbate. In addition, krypton, which is a weak adsorbate, is recovered by the speed separation type PSA method in which krypton is a weak adsorbate and nitrogen is a strong adsorbate.

As explained above, nitrogen and krypton can be recovered in a high concentration simultaneously by using adsorbents having different properties and crossing the strong adsorbate and the weak adsorbate. All of the exhaust gas from each PSA device is recovered in a buffer tank, mixed with the material gas, and supplied into each PSA device again. It is disclosed that the method of Kawai et al. can recover krypton in a concentration in a range from 99.9 to 99.99% and nitrogen in a concentration in a range from 97 to 99.9% from a mixture gas containing krypton and nitrogen.

However, when the material gas contains hydrogen or helium, which is a weak adsorbate, it is impossible to prevent hydrogen or helium from being contaminated in krypton, because krypton is recovered by the PSA method for recovering a weak adsorbate.

| [Patent document 1] | U.S. Pat. Publication No. 4,599,094 |
| [Patent document 2] | U.S. Pat. Publication No. 4,810,265 |
| [Patent document 3] | U.S. Pat. Publication No. 6,527,830 |
| [Patent document 4] | U.S. Pat. Publication No. 5,085,674 |
| [Patent document 5] | U.S. Pat. Publication No. 6,500,235 |
| [Patent document 6] | U.S. Pat. Publication No. 4,359,328 |
| [Patent document 7] | Japanese Patent Application, First Publication No. 2002-126435 |

DISCLOSURE OF THE INVENTION

Problems to be Solved

In order to recover the target component from the exhaust gas and use it again, it is necessary to remove unnecessary components such as a minute amount of impurities, by-products, and a purge gas. However, many kinds of unnecessary components are often contained in the exhaust gas, as explained above. Therefore, it is not easy to recover highly valuable components win a high concentration with a high recovery percentage.

However, equilibrium separation type adsorbents adsorb krypton and xenon more easily than helium, hydrogen, oxygen, nitrogen, argon, etc. contained in the exhaust gas. When the exhaust gas does not contain components of which the molecular diameter is small such as hydrogen, and helium, an adsorbent having a fine pore diameter of about 0.4 nm, such as a Na-A type zeolite and a CMS is used because krypton and xenon have a larger molecular diameter than that of oxygen, nitrogen, argon, etc. When a speed separation type adsorbent which does not readily adsorb krypton and xenon and easily adsorbs nitrogen, oxygen and argon is used at the same time, they can be separated.

The most simple gas separation method is a method in which the target component such as krypton and xenon is concentrated as a strong adsorbate, and the other components are discharged all together as a weak adsorbate. A method in which the target component is concentrated as a weak adsorbate, and the other components are discharged all together as a strong adsorbate is also simple and preferable. In order to recover the target component in a high concentration with a high recovery percentage, when the target component is a strong adsorbate, a method in which the amount of the strong adsorbate contained in the weak adsorbate is reduced is necessary. When the target component is a weak adsorbate, a method in which the amount of the weak adsorbate contained in the strong adsorbate is reduced is necessary. In other words, a gas separation method which can concentrate simultaneously the strong adsorbate and the weak adsorbate in a high concentration is necessary.

However, the PSA method which is suggested in U.S. Pat. No. 4,559,094 can concentrate a strong adsorbate in a relatively high concentration. However, the concentration of a weak adsorbate is insufficient. The Duplex PSA method can easily concentrate a weak adsorbate. However, it is difficult to concentrate a strong adsorbate to 99.9% or greater. Therefore, there are no gas separation methods which satisfy the object of the present invention, that is, which can recover a strong adsorbate or a weak adsorbate in a high concentration with a high recovery percentage in the conventional art.

In consideration of the above described problems, it is an object of the present invention to provide a new PSA method which can concentrate simultaneously a strong adsorbate such as xenon and a weak adsorbate such as nitrogen in a high concentration when highly valuable gas such as xenon and krypton contained in the exhaust gas from the semiconductor manufacturing equipment, etc. is recovered in a high concentration with a high recovery percentage.

Means for Solving the Problem

In order to solve the problem, the present invention provides a first PSA method in which a mixture gas containing at least two main components is used as a material gas, an adsorbent which easily adsorbs at least one main component in the material gas and does not readily adsorb at least another main component in the material gas is used, the method uses a separation apparatus comprising a lower column and an upper column which are filled with the adsorbent, a material gas storage tank for storing the material gas to be introduced into the lower column, a strong adsorbate storage tank for storing a main component which is easily adsorbed by the adsorbent, and a compressor for pressurizing gas from the material gas storage tank or the strong adsorbate storage tank and introducing into the lower column, and the strong adsorbate which is easily adsorbed by the adsorbent and the weak adsorbate which is not readily adsorbed by the adsorbent are recovered, wherein the method comprises:

a step (a) in which the gas in the material gas storage tank is pressurized and introduced into the lower column, the strong adsorbate in the material gas is adsorbed by the adsorbent, gas from the lower column which contains a less amount of the strong adsorbate is introduced into the upper column, the strong adsorbate contained in the gas is adsorbed by the adsorbent in the upper column, and the weak adsorbate which flows from the upper column is recovered;

a step (b) in which the gas in the strong adsorbate storage tank is pressurized by the compressor and introduced into the lower column, the weak adsorbate co-adsorbed by the adsorbent in the lower column and the weak adsorbate remaining in space among the adsorbent are led into the upper column, the strong adsorbate contained in the gas led out from the lower column is adsorbed by the adsorbent in the upper column, and the weak adsorbate which flows from the upper column is recovered;

a step (c) in which the lower column is depressurized, the strong adsorbate adsorbed by the adsorbent filled in the lower column is desorbed, and desorbed strong adsorbate is recovered in the strong adsorbate storage tank;

a step (d) in which the upper column is depressurized, the gas adsorbed by the adsorbent in the upper column is desorbed, the desorbed gas is introduced into the lower column, and gas which flows from the lower column is recovered in the material gas storage tank; and a step (e) in which the weak adsorbate recovered in the steps (a) and (b) is introduced into the upper column as a counter current purge gas, the strong adsorbate adsorbed by the adsorbent in the upper column is displaced and desorbed, gas which flows from the upper column is introduced into the lower column, the strong adsorbate adsorbed by the adsorbent in the lower column is displaced and desorbed by the gas introduced into the lower column, and gas which from the lower column is recovered in the material gas storage tank; and these steps (a) to (e) are sequentially repeated based on a predetermined sequence, and the strong adsorbate and the weak adsorbate in the material gas are simultaneously recovered in a high concentration with a high recovery percentage.

In the method, it is preferable that the step (b) uses at least two lower columns and at least two upper columns, and contains the following step (i):

a step (i) in which the upper column after finishing the step (b) and the other upper column after finishing the step (e) are connected, gas in the upper column after finishing the step (b) is introduced into the other upper column after finishing the step (e), gas in the lower column after finishing the step (b) is introduced into the upper column after finishing the step (b), and gas in the strong adsorbate storage tank is introduced into the lower column, and that the step (e) uses at least two lower columns and at least two upper columns, and contains the following step (j):

a step (j) in which the upper column after finishing the step (e) and the other upper column after finishing the step (b) are connected, gas in the upper column after finishing the step (b) is introduced into the other upper column after finishing the step (e), gas in the upper column after finishing the step (e) is introduced into the lower column after finishing the step (e).

It is also preferable that the step (b) uses at least two lower columns and at least two upper columns, and contains the following step (g):

a step (g) in which the upper column after finishing the step (a) and the other upper column after finishing the step (e) are connected, gas in the upper column after finishing the step (a) is introduced into the other upper column after finishing the step (e), gas in the lower column after finishing the step (a) is introduced into the upper column after finishing the step (a), and gas in the strong adsorbate storage tank is introduced into the lower column, and that the step (e) uses at least two lower columns and at least two upper columns, and contains the following step (j):

a step (j) in which the upper column after finishing the step (e) and the other upper column after finishing the step (b) are connected, gas in the upper column after finishing the step (b) is introduced into the other upper column after finishing the step (e), gas in the upper column after finishing the step (e) is introduced into the lower column after finishing the step (e).

In addition, the present invention provides a second PSA method in which a mixture gas containing at least two main components is used as a material gas, an adsorbent which easily adsorbs at least one main component in the material gas and does not readily adsorb at least another main component in the material gas is used, the method uses a separation apparatus comprising a lower column and a upper column which are filled with the adsorbent, a material gas storage tank for storing the material gas to be introduced into the lower column, a strong adsorbate low pressure storage tank for storing the strong adsorbate from the lower column, a compressor for pressurizing gas from the material gas storage tank or the strong adsorbate low pressure storage tank and introducing the lower column, a strong adsorbate high pressure storage tank for storing the strong adsorbate from the lower column, and a weak adsorbate storage tank for storing the weak adsorbate from the upper column, and the strong adsorbate which is easily adsorbed by the adsorbent and the weak adsorbate which is not readily adsorbed by the adsorbent are recovered, wherein the method comprises:

a step (a') in which gas in the material gas storage tank is pressurized by the compressor and introduced into the lower column, the strong adsorbate in the material gas is adsorbed by the adsorbent, gas from the lower column which contains a less amount of the strong adsorbate is introduced into the upper column, the strong adsorbate contained in the gas is adsorbed by the adsorbent in the upper column, and the weak adsorbate which flows from the upper column is recovered in the weak adsorbate storage tank;

a step (b'+i') in which gas from the strong adsorbate low pressure storage tank is pressurized and introduced into the lower column, the weak adsorbate co-adsorbed by the adsorbent in the lower column and the weak adsorbate remaining in space among the adsorbent are introduced into the upper column, the strong adsorbate contained in gas which flows from the lower column is adsorbed by the adsorbent in the upper column, the weak adsorbate flows from the upper column, the weak adsorbate which flows is introduced into the upper column after finishing a step (e'), which is explained below, to depressurize the lower column and upper column after finishing the step (b'+i');

a step (c') in which the lower column is depressurized, the strong adsorbate adsorbed by the adsorbent filled in the lower column is desorbed, and the strong adsorbate desorbed is recovered in the strong adsorbate high pressure storage tank, and the strong adsorbate is further desorbed and recovered in the strong adsorbate low pressure storage tank;

a step (d') in which the upper column is depressurized, gas adsorbed by the adsorbent in the upper column is desorbed, the desorbed gas is introduced into the lower column, and gas which flows from the lower column is recovered in the material gas storage tank; and a step (e') in which the weak adsorbate recovered in the step (a') is introduced into the upper column as a counter current purge gas, the strong adsorbate adsorbed by the adsorbent in the upper column is displaced and desorbed, gas which flows from the upper column is introduced into the lower column, the strong adsorbate adsorbed by the adsorbent in the lower column is displaced and desorbed by the gas introduced into the lower column, and gas which flows from the lower column is recovered in the material gas storage tank; and a step (j') in which the weak adsorbate introduced in the step (b'+i') is introduced into the upper column to pressurize the upper column and the lower column after finishing the step (e') and these steps (a'), (b'+i'), (c'), (d'), (e'), and (j') are sequentially repeated based on a predetermined sequence, and the strong adsorbate and the weak adsorbate in the material gas are simultaneously recovered in a high concentration with a high recovery percentage.

In the second PSA method, it is preferable that the time of the step (b'+i') or the step (j') be in a range from 10 to 50% relative to a cycle time.

In the first and second PSA methods, it is preferable that the adsorbent be an adsorbent which separates the strong adsorbate and the weak adsorbate based on the difference between the equilibrium adsorption amount.

It is preferable that the adsorbent which separates the strong adsorbate and the weak adsorbate based on the difference of the equilibrium adsorption amount be selected from the group consisting of an activated carbon, a Na-X type zeolite, a Ca-X type zeolite, a Ca-A type zeolite, and a Li-X type zeolite.

In addition, it is preferable that the strong adsorbate to the adsorbent be xenon or krypton, and the weak adsorbate to the adsorbent be gas containing one of oxygen, nitrogen, and argon.

It is also preferable that the adsorbent be an adsorbent which separates the strong adsorbate and the weak adsorbate based on the difference of the adsorption speed.

It is preferable that the fine pore diameter of the adsorbent which separates the strong adsorbate and the weak adsorbate based on the difference of the adsorption speed be about 0.4 nm.

It is preferable that the weak adsorbate to the adsorbent be xenon or krypton, and the strong adsorbate to the adsorbent be gas containing one of oxygen, nitrogen, and argon.

In addition, in order to solve the problem, the present invention provides a first PSA apparatus for separating and recovering a strong adsorbate and a weak adsorbate in a material gas, wherein the mixture gas containing at least two main components is used as a material gas, an adsorbent which easily adsorbs at least one main component in the material gas and does not readily adsorb at least another main component in the material gas is used, and the PSA apparatus comprises a lower column and a upper column which are filled with the adsorbent, a material gas storage tank for storing the material gas to be introduced into the lower column, a strong adsorbate storage tank for storing the strong adsorbate from the lower column, and a compressor for pressurizing gas from the material gas storage tank or the strong adsorbate storage tank and introducing the gas into the lower column, a weak adsorbate storage tank for storing the weak adsorbate from the upper column, and a control portion.

In the first PSA apparatus, it is preferable that the material gas storage tank or the strong adsorbate storage tank comprise a mechanism for refilling the strong adsorbate from the outside of the apparatus.

In the first PSA apparatus, it is also preferable that the material gas storage tank or the weak adsorbate storage tank comprise a mechanism for refilling the weak adsorbate from the outside of the apparatus.

In addition, in order to solve the problem, the present invention provides a second PSA apparatus for separating and recovering a strong adsorbate and a weak adsorbate in a material gas, wherein the mixture gas containing at least two main components is used as the material gas, an adsorbent which easily adsorbs at least one main component in the material gas and does not readily adsorb at least another main component in the material gas is used, the PSA apparatus comprises a lower column and a upper column which are filled with the adsorbent, a material gas storage tank for storing the material gas to be introduced into the lower column, a strong adsorbate low pressure storage tank for storing the strong adsorbate from the lower column, and a compressor for pressurizing gas from the material gas storage tank or the strong adsorbate low pressure storage tank and introducing the gas into the lower column, a strong adsorbate high pressure storage tank for storing the strong adsorbate from the lower column, a weak adsorbate storage tank for storing the weak adsorbate from the upper column, and a control portion, and the control portion controls the following steps (a'), (b'+i'), (c'), (d'), (e'), and (j') based on a predetermined sequence, a step (a') in which gas in the material gas storage tank is pressurized by the compressor and introduced into the lower column, the strong adsorbate in the material gas is adsorbed by the adsorbent, gas from the lower column which contains a less amount of the strong adsorbate is introduced into the upper column, the strong adsorbate contained in the gas is adsorbed by the adsorbent in the upper column, and the weak adsorbate which flows from the upper column is recovered in the weak adsorbate storage tank;

a step (b'+i') in which gas from the strong adsorbate low pressure storage tank is pressurized and introduced into the lower column, the weak adsorbate co-adsorbed by the adsorbent in the lower column and the weak adsorbate remaining in space among the adsorbent are introduced into the upper column, the strong adsorbate contained in gas which flows from the lower column is adsorbed by the adsorbent in the upper column, the weak adsorbate flows from the upper column, the weak adsorbate which flows is introduced into the upper column after finishing a step (e'), which is explained below, to depressurize the lower column and upper columns after finishing the step (b'+i');

a step (c') in which the lower column is depressurized, the strong adsorbate adsorbed by the adsorbent filled in the lower column is desorbed, and the desorbed strong adsorbate is recovered in the strong adsorbate high pressure storage tank, and the strong adsorbate is further desorbed and the desorbed strong adsorbate is recovered in the strong adsorbate low pressure storage tank;

a step (d') in which the upper column is depressurized, gas adsorbed by the adsorbent in the upper column is desorbed, the desorbed gas is introduced into the lower column, and gas which flows from the lower column is recovered in the material gas storage tank;

a step (e') in which the weak adsorbate recovered in the steps (a') is introduced into the upper column as a counter current purge gas, the strong adsorbate adsorbed by the adsorbent in the upper column is displaced and desorbed, gas which flows from the upper column is introduced into the lower column, the strong adsorbate adsorbed by the adsorbent in the lower column is displaced and desorbed by the gas introduced into the lower column, and gas which flows from the lower column is recovered in the material gas storage tank; and a step (j') in which the weak adsorbate introduced in the step (b'+i') is introduced into the upper column to pressurize the upper column and the lower column after finishing the step (e').

In the first and second PSA apparatuses, it is preferable that the adsorbent be an adsorbent which separates the strong adsorbate and the weak adsorbate based on the difference of the equilibrium adsorption amount.

It is preferable that the adsorbent be selected from the group consisting of an activated carbon, a Na-X type zeolite, a Ca-X type zeolite, a Ca-A type zeolite, and a Li-X type zeolite.

It is also preferable that the adsorbent be an adsorbent which separates the strong adsorbate and the weak adsorbate based on the difference of the adsorption speed.

In the second PSA apparatus, it is preferable that the process time of the step (b'+i') or the step (j') be controlled in a range from 10 to 50% relative to a cycle time.

Effects of the Present Invention

The PSA method of the present invention can recover the highly valuable target components in a high concentration with a high recovery percentage from the mixture gas discharged from the semiconductor manufacturing device, etc. Therefore, it is possible to reuse the atmospheric gas used in the semiconductor manufacturing device, etc. The cost can be significantly reduced. In addition, the initial cost for the device can be also reduced.

In particular, the strong adsorbate is led from the strong adsorbate high pressure storage tank as a product gas in the second PSA method of the present invention. Therefore, a product gas pressure required by the destination can be maintained without an additional compressor by fixing the appropriate amount in the strong adsorbate high pressure storage tank.

EXPLANATION OF REFERENCE SYMBOLS

Figure 1:
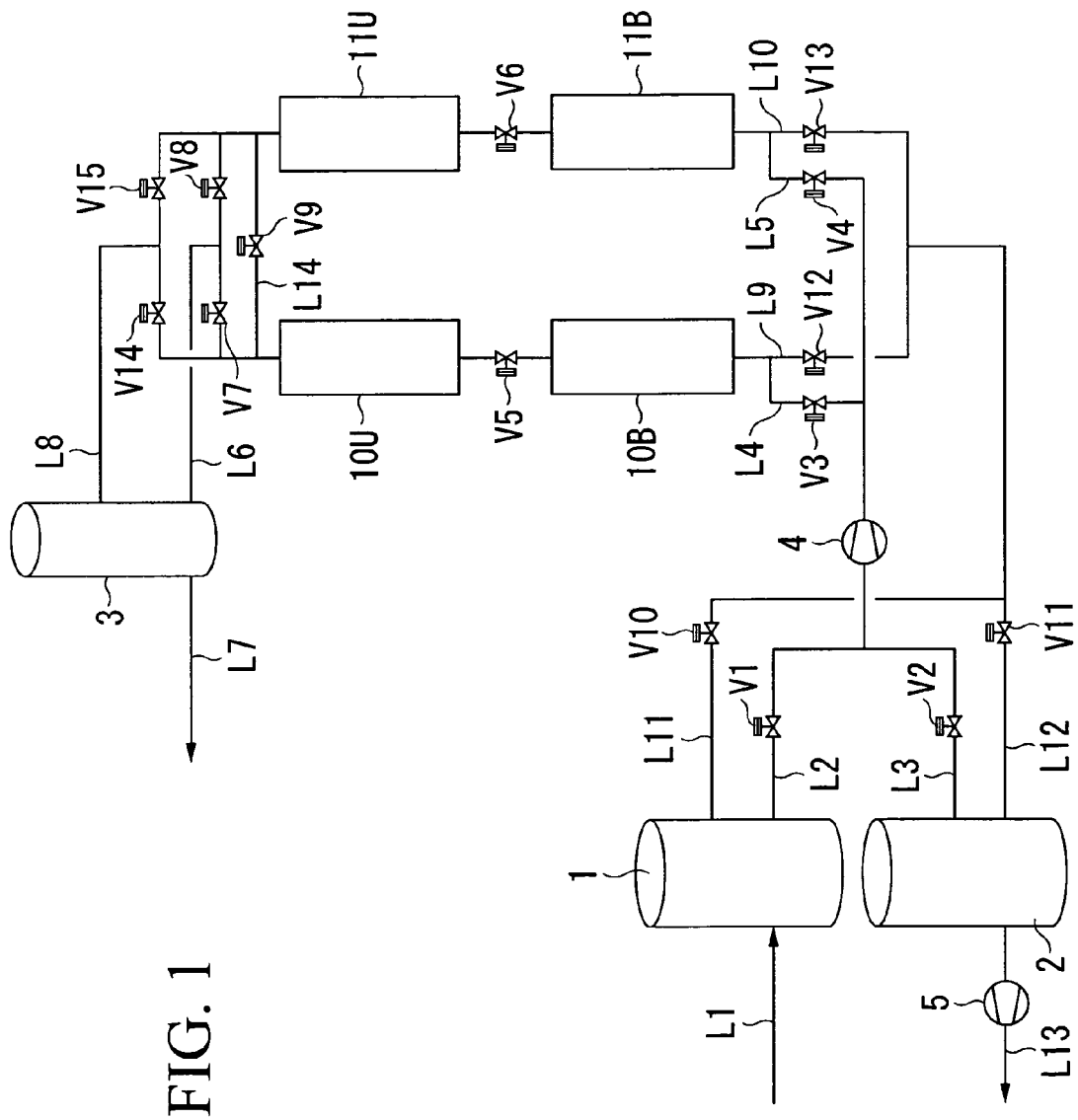
FIG. 1 is a schematic view showing a PSA apparatus used to perform the first PSA method of the present invention.

1 . . . material gas storage tank 2 . . . strong adsorbate storage tank 3 . . . weak adsorbate storage tank 4 and 5 . . . compressor 10B and 11B . . . lower column 10U and 11U . . . upper column 20 . . . control portion 22 . . . strong adsorbate low pressure storage tank 25 . . . strong adsorbate high pressure storage tank

BEST MODE FOR CARRYING OUT THE INVENTION

The PSA method of the present invention is a gas separation method using the selectivity of an adsorbent. Selectivity of an adsorbent to gas to be adsorbed depends on differences of the amount of equilibrium adsorption and adsorption speed. An activated carbon, which belongs to equilibrium separation type adsorbents (adsorbents having selectivity depending on the difference of the equilibrium separation amount), adsorbs xenon 10 times or greater than nitrogen (298 K, 100 kPa). In a carbon molecular sieve (CMS), which belong to speed separation type adsorbents (adsorbents having selectivity depending on adsorption speed), the ratio between the adsorption speed of oxygen and nitrogen is about 15.

In the PSA method of the present invention, a strong adsorbate which is easily adsorbed by an adsorbent is xenon to an activated carbon, and oxygen to a CMS. A weak adsorbate which is not readily adsorbed by an adsorbent is nitrogen to an activated carbon, and nitrogen to a CMS.

The strong adsorbate and the weak adsorbate vary depending on the adsorbent used. When the adsorbent changes, the strong adsorbate may be the weak adsorbate, and the weak adsorbate may be the strong adsorbate. For example, when an equilibrium separation type adsorption such as an activated carbon, a Na-X type zeolite, a Ca-X type zeolite, a Ca-A type zeolite, and a Li-X type zeolite is used, examples of the strong adsorbate include xenon and krypton. Examples of the weak adsorbate include nitrogen, hydrogen, helium, argon, and oxygen. In contrast, when a speed separation type adsorbent such as a Na-A type zeolite and a CMS is used, examples of the strong adsorbate include nitrogen, oxygen, and argon. Examples of the weak adsorbate include krypton and xenon.

The first PSA method of the present invention is explained referring to figures. FIG. 1 is a schematic view showing a PSA apparatus which can perform the first PSA method of the present invention.

The PSA apparatus has a material gas storage tank 1 for storing a mixture gas containing a target gas and at least one kind of component other than the target gas; a strong adsorbate storage tank 2 for storing a strong adsorbate; a weak adsorbate storage tank 3 for storing a weak adsorbate; a compressor 4 for pressurizing gas from the material gas storage tank 1 or the strong adsorbate storage tank 2; a compressor 5 for pressurizing gas from the strong adsorbate storage tank 2; and four columns which are lower columns 10B and 11B and upper columns 10U and 11U.

Reference L1 denotes a line for introducing the material gas into the material gas storage tank 1.

Reference L2 denotes a line for introducing gas in the material gas storage tank 1 into the compressor 4.

Reference L3 denotes a line for introducing gas in the strong adsorbate storage tank 2 into the compressor 4.

Reference L4 denotes a line for introducing gas from the compressor 4 into a lower column 10B, and L5 denotes a line for introducing gas from the compressor 4 into the lower column 11B.

Reference L6 denotes a line for introducing gas from the upper columns 10U and 11U into the weak adsorbate storage tank 3 or introducing gas from the weak adsorbate storage tank 3 into the upper columns 10U and 11U.

Reference L7 denotes a line for supplying a weak adsorbate from the weak adsorbate storage tank 3 to the outside of the apparatus.

Reference L8 denotes a line for introducing a weak adsorbate from the weak adsorbate storage tank 3 into the upper columns 10U and 11U as a counter current purge gas.

Reference L9 denotes a line for returning gas from the lower column 10B into the material gas storage tank 1 or the strong adsorbate storage tank 2, and reference L10 denotes a line for returning gas from the lower column 11B into the material gas storage tank 1 or the strong adsorbate storage tank 2.

Reference L11 denotes a line for returning gas from the lower columns 10B and 11B into the material gas storage tank 1.

Reference L12 denotes a line for returning gas from the lower columns 10B and 11B into the strong adsorbate storage tank 2.

Reference L13 denotes a line for supplying a strong adsorbate from the strong adsorbate storage tank 2 into the outside of the apparatus.

Reference L14 denotes a pressure equilibrium line for equalizing pressure between the upper columns 10U and 11U.

The lower columns 10B and 11B and the upper columns 10U and 11U are filled with an adsorbent which easily adsorbs or does not readily adsorb a target component in the material gas, and does not readily adsorb or easily adsorbs the components other than the target component.

Below, one embodiment of the first PSA method of the present invention is explained referring to the first PSA apparatus. In this embodiment, the target component is xenon, and main component other than xenon is nitrogen.

An adsorbent filled in the lower columns 10B and 11B and the upper columns 10U and 11U is an activated carbon which is an equilibrium separation type adsorbent. An activated carbon has a large adsorption amount of xenon based on equilibrium adsorption (an activated carbon easily adsorbs xenon), and a small adsorption amount of nitrogen based on equilibrium adsorption (an activated carbon does not readily adsorb nitrogen).

Figure 2:
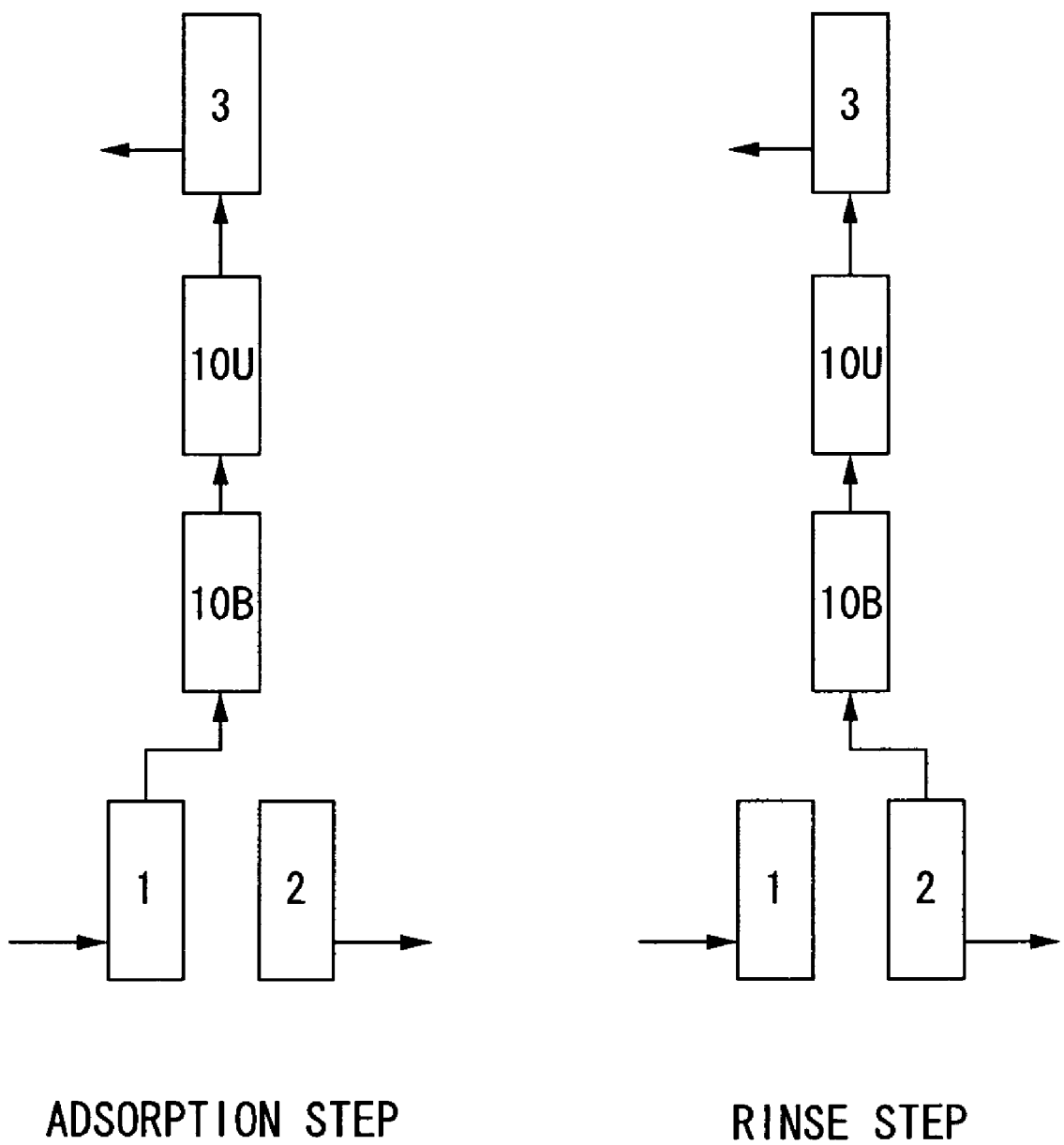
FIG. 2 is a flow chart showing a half cycle of the first PSA method of the present invention.

FIG. 2 shows a half cycle in the first PSA method of the present invention. As shown below, the half cycle has <adsorption step>-<rinse step>. The switching condition of the valves in each step is operated as shown in Table 1.

TABLE 1

|    | Adsorption step | Rinse step |
|----|-----------------|------------|
| V1 | Open            | Closed     |
| V2 | Closed          | Open       |
| V3 | Open            | Open       |
| V4 | Closed          | Closed     |
| V5 | Open            | Open       |
| V7 | Open            | Open       |
| V8 | Closed          | Closed     |
| V9 | Closed          | Closed     |

(a) <Adsorption Step>

The mixture gas from the material gas storage tank 1 is pressurized by the compressor 4, and supplied into the lower column 10B via the lines L2 and L4. Simultaneously, nitrogen stored in the weak adsorbate storage tank 3 is supplied into the upper column 10U via the L6 (the upper column 10U can be also pressurized by closing the valve 7 and supplying only the mixture gas from the material gas storage tank 1).

Since the lower column 10B and the upper column 10U is connected by opening the valve V5, the lower column 10B and the upper column 10U are pressurized substantially similarly. The mixture gas from the material gas storage tank 1 is a mixture gas containing the material gas introduced from the line L1 and gas discharged from the lower columns 10B and 11B in an upper column depressurization step and a purge regeneration step which are explained below.

As the mixture gas supplied into the lower column 10B reaches toward an upper portion in the lower column 10B, xenon is adsorbed preferentially. Thereby, nitrogen is concentrated in the gas phase. The concentrated nitrogen is introduced from the lower column 10B into the upper column 10U. In the upper column 10U, xenon contained in the nitrogen is further adsorbed. After the pressure of the upper column 10U is larger than the pressure in the weak adsorbate storage tank 3, the nitrogen concentrated further in the upper column 10U is introduced into the weak adsorbate storage tank 3 via the line L6. The nitrogen in the weak adsorbate storage tank 3 is discharged from the line L7 to the outside of the apparatus depending on the flow rate of nitrogen contained in the material gas. The remaining nitrogen is used as a counter current purge gas in a purge regeneration step.

(b) <Rinse Step>

The kind of gas introduced into the lower column 10B is changed to xenon stored in the strong adsorbate storage tank 2 by closing the valve V1 and opening the valve V2. Nitrogen co-adsorbed by the adsorbent in the lower column 10B and nitrogen in spaces among the adsorbent particles are pushed into the upper column 10U by introducing xenon in the strong adsorbate storage tank 2 into the lower column 10B. Thereby, the lower column 10B is saturated with xenon. In this period of time, the introduction of nitrogen from the upper column 10U into the weak adsorbate storage tank 3 is continuously performed. Similar in the (a) <adsorption step>, a part of nitrogen in the weak adsorbate storage tank 3 is discharged into the outside of the apparatus, and the remaining nitrogen is used as a counter current purge gas.

Figure 3:
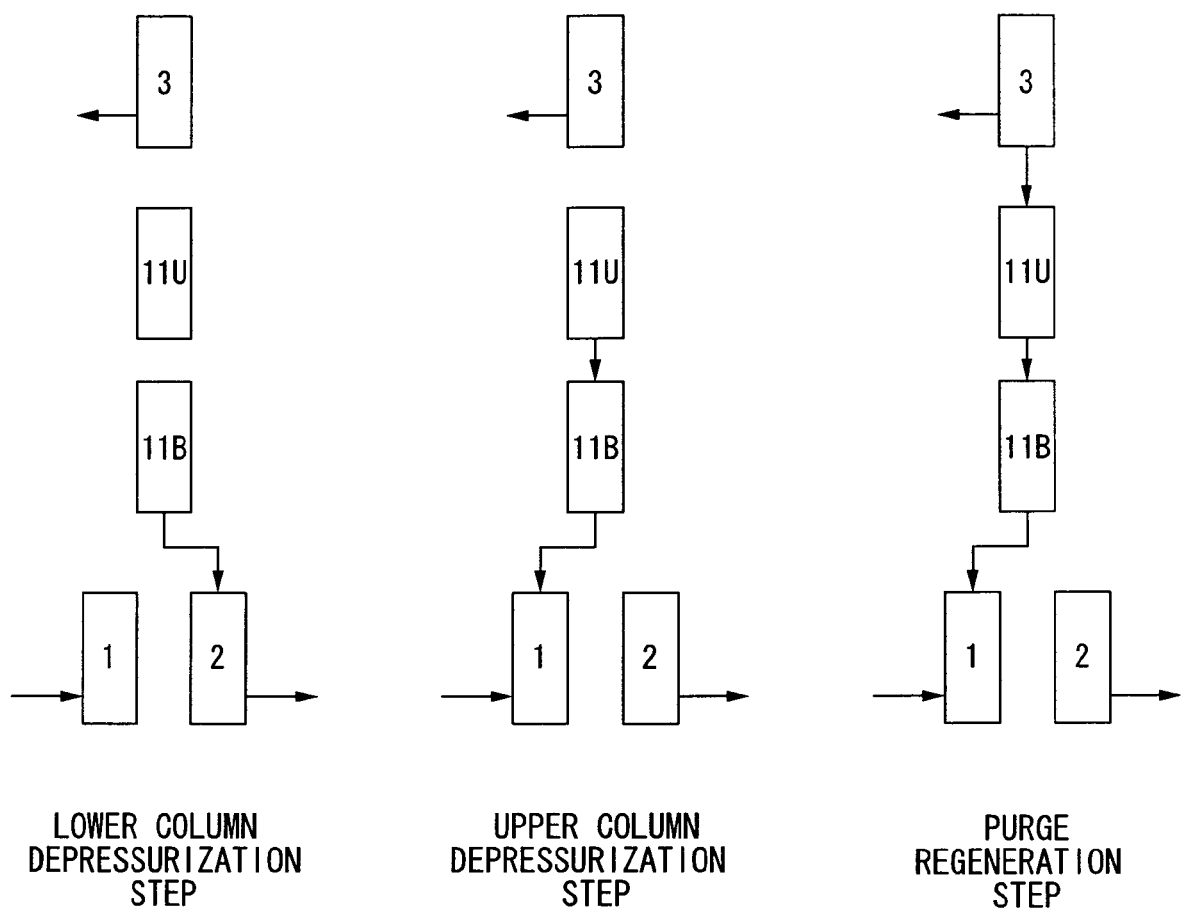
FIG. 3 is a flow chart showing another half cycle of the first PSA method of the present invention

FIG. 3 shows the other half cycle in the PSA method. As shown below, the other half cycle has (c) <lower column depressurization step>-(d) <upper column depressurization step>-(e) <purge regeneration step>. Moreover, during the lower column 10B and the upper column 10U perform the two steps explained above, the lower column 11B and the upper column 11U perform the three steps shown in FIG. 3. The switching condition of the valves in each step shown in FIG. 3 is operated as shown in Table 2.

TABLE 2

|  | Lower column depressurization step | Upper column depressurization step | Purge generation step |
|---|---|---|---|
| V6 | Closed | Open | Open |
| V10 | Closed | Open | Open |
| V11 | Open | Closed | Closed |
| V12 | Closed | Closed | Closed |
| V13 | Open | Open | Open |
| V14 | Closed | Closed | Closed |
| V15 | Closed | Closed | Open |

(c) <Lower Column Depressurization Step>

The valves V6 and V10 are closed, and the valves V11 and V13 are opened. Thereby, the xenon adsorbed in the lower column 10B during the steps of (a) to (b) is recovered in the strong adsorbate storage tank 2 via the lines L10 and L12 due to a pressure difference between the lower column 11B and the strong adsorbate storage tank 2. The xenon recovered in the strong adsorbate storage tank 2 is pressurized by the compressor 5 and is recovered from the line L13 as a product depending on the flow rate of xenon contained in the material gas. The remaining xenon is used as a counter current purge gas in the (b) <rinse step>. In this period of time, the valves V6 and V8 are closed, and the upper column 11U is in a resting state.

(d) <Upper Column Depressurization Step>

The valve V11 is closed, and the valves V6 and V10 are opened. Then, a pressure difference is generated in the upper column 11U in a resting state during the (c) <lower column depressurization step> and the depressurized lower column 11B. The gas in the upper column 11U flows into the lower column 11B. The gas introduced into the lower column 11B purges the inside of the lower column 11b, and is recovered in the material gas storage tank 1 via the lines L10 and L11. The gas recovered in the material gas storage tank 1 is mixed with the material gas introduced from the line L1 again, and then supplied again into the lower column during the (a) <adsorption step>.

(e) <Purge Regeneration Step>

The valve V15 is opened. The nitrogen stored in the weak adsorbate storage tank 3 is introduced into the upper column 11U, via the line L8 as a counter current purge gas. The nitrogen introduced into the upper column 11U displaces and desorbs xenon adsorbed as the nitrogen reaches toward the bottom of the column. Gas containing a large amount of xenon desorbed is recovered in the material gas storage tank 1 via the lower column 10B, and the lines L10 and L11. Similar to the (d) <upper column depressurization step>, the gas recovered in the material gas storage tank 1 is mixed with the material gas introduced from the line L1, and is supplied again into the lower column in the (a) <adsorption step>.

Here, the nitrogen discharged from the upper column 10U in the (a) <adsorption step> or the (b) <rinse step> may be directly introduced into the upper column in the (e) <purge regeneration step> without passing through the weak adsorbate storage tank 3 as a counter current purge gas.

Nitrogen and xenon can be continuously concentrated by performing repeatedly the five steps explained above in the upper column 10B and the lower column 10U, and the lower column 11B and the upper column 11U.

During (a) <adsorption step> to (b) <rinse step> in the lower column 10B and the upper column 10U, (c) <lower column depressurization step> to (d) <upper column depressurization step> to (e) <purge regeneration step> are performed in the lower column 11B and the upper column 11U.

During the (c) <lower column depressurization step> to (d) <upper column depressurization step> to (e) <purge regeneration step> in the lower column 10B and the upper column 10U, the (a) <adsorption step> to (b) <rinse step> are performed in the lower column 11B and the upper column 11U.

Moreover, introduction of the material gas from the line L1, discharge of nitrogen from the line L7, and flowing out of xenon from the line L13 do not depend on the steps and are continuously performed. However, manufacture equipment for semiconductor products or display products, which requires the PSA method to be performed, does not use frequently xenon, that is, the manufacturing equipment does not discharge frequently the exhaust gas which is the material gas. In such a case, the PSA apparatus in this embodiment can maintain supplying suspended conditions while maintaining conditions which can provide the product gas at any time by returning nitrogen which flows from the line L7 and xenon which flows from the line L13 (not shown in figures).

In addition, electrical power used can be reduced by performing an equalization and depressurization step after the rinse step, and an equalization and pressurization step after the purge regeneration step, as explained below.

(i) and (g) <Equalization and Depressurization Step>

The valve V7 is closed and the valve V9 is opened. The gas in the upper column 10U is introduced into the upper column 11U due to the pressure difference between the upper columns 10U and 11U, via the line L14. Thereby, the pressure in the upper column 10U decreases (equalization and reduction operation). The gas in the lower column 10B is introduced into the upper column 10U. A small amount of nitrogen remaining in the top portion of the lower column 10B is washed away by xenon desorbed by the pressure reduction, and introduced into the upper column 10U. In this period of time, xenon is continuously supplied from the strong adsorbate storage tank 2.

(j) <Equalization and Pressurization Step>

The valves V13 and V15 are closed, and the valve V19 is opened. Thereby the gas in the upper column 10U is introduced into the upper column 11U. The nitrogen concentration of the gas introduced into the upper column 11U is high. Therefore, it is possible to push down xenon in the upper column 11U into the bottom portion of the upper column and the lower column 11B (equalization and pressurization operation).

Figure 4:
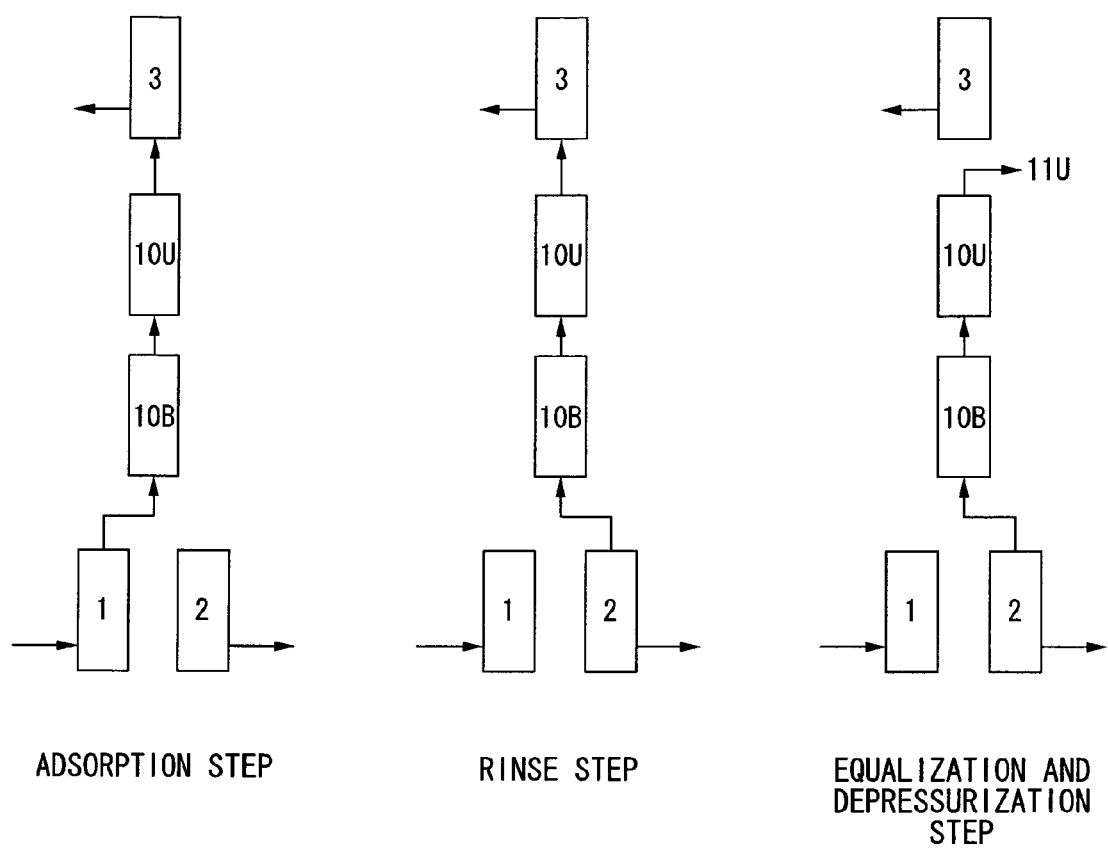
FIG. 4 is a flow chart showing a half cycle of the first PSA method of the present invention

FIG. 4 shows a half cycle adding (i) <equalization and depressurization step> to (a) <adsorption step> to (b) <rinse step>.

Figure 5:
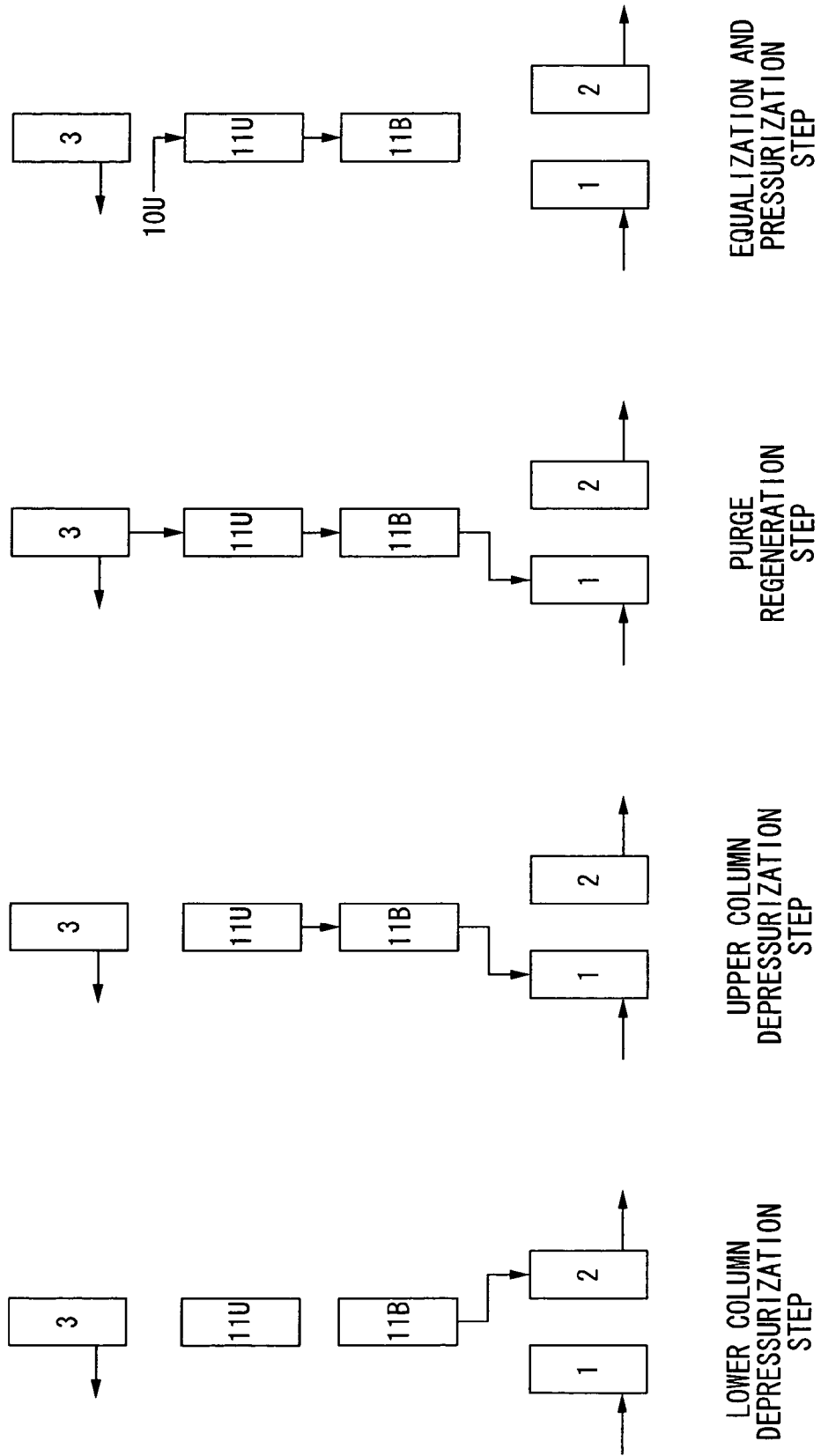
FIG. 5 is a flow chart showing another half cycle of the first PSA method of the present invention.

FIG. 5 shows another half cycle adding (j) <equalization and pressurization step> to (c) <lower column depressurization step> to (d) <upper column depressurization step> to (e) <purge regeneration step>.

While the lower column 10B and the upper column 10U perform the three steps shown in FIG. 4, the lower column 11B and the upper column 11U perform the four steps shown in FIG. 5. The switching condition of the valves in each step shown in FIGS. 4 and 5 is operated as shown in Tables 3 and 4.

TABLE 3

|  | Adsorption step | Rinse step | Equalization and depressurization step |
|---|---|---|---|
| V1 | Open | Closed | Closed |
| V2 | Closed | Open | Open |
| V3 | Open | Open | Open |
| V4 | Closed | Closed | Closed |
| V5 | Open | Open | Open |
| V7 | Open | Open | Closed |
| V8 | Closed | Closed | Closed |
| V9 | Closed | Closed | Open |

TABLE 4

|  | Lower column depressurization step | Upper column depressurization step | Purge regeneration step | Equalization and depressurization step |
|---|---|---|---|---|
| V6 | Closed | Open | Open | Open |
| V10 | Closed | Open | Open | Closed |
| V11 | Open | Closed | Closed | Closed |
| V12 | Closed | Closed | Closed | Closed |
| V13 | Open | Open | Open | Closed |
| V14 | Closed | Closed | Closed | Closed |
| V15 | Closed | Closed | Open | Closed |

Nitrogen and xenon can be continuously concentrated by performing repeatedly the seven steps explained above in the upper column 10B and the lower column 10U, and the lower column 11B and the upper column 11U.

During (a) <adsorption step> to (b) <rinse step> to (g) <equalization and depressurization step> in the lower column 10B and the upper column 10U, (c) <lower column depressurization step> to (d) <upper column depressurization step> to (e) <purge regeneration step> to (j) <equalization and pressurization step> are performed in the lower column 11B and the upper column 11U.

During the (c) <lower column depressurization step> to (d) <upper column depressurization step> to (e) <purge step> to (j) <equalization and pressurization step> in the lower column 10B and the upper column 10U, the (a) <adsorption step> to (g) <equalization and depressurization step> to (b) <rinse step> are performed in the lower column 11B and the upper column 11U.

Moreover, the (b) <rinse step> can be omitted in the seven steps. That is, the present invention can be conducted by only six steps.

In the first PSA method and the first PSA apparatus of the present invention, xenon and the like which are supplied to manufacturing equipment can be recovered and used cyclically. However, the amount of xenon decreases gradually because xenon is discharged together with nitrogen which is discharged as an exhaust gas from the cycle made by the PSA apparatus of the present invention and the manufacturing equipment. Therefore, in order to operate stably for a long period of time, it is necessary to supply the same amount of xenon as that discharged with the nitrogen. In the PSA apparatus of the present invention, xenon is refilled from an outside device (not shown in figures), such as a high concentration xenon cylinder in the material gas storage tank 1 or the strong adsorbate storage tank 2. Thereby, it is possible to stably maintain the cycle of xenon.

The first PSA apparatus of the present invention is operated by a normal pressure regeneration PSA method in which the strong adsorbate is adsorbed under pressurized conditions, and the adsorbed strong adsorbate is desorbed under normal pressure conditions, for example. However, it is also possible to perform the gas separation method of the present invention by a vacuum pressure swing adsorption method (VPSA) in which the strong adsorbate is adsorbed under normal pressure conditions, and the adsorbed strong adsorbate is desorbed under conditions of which the pressure is normal pressure or less using a vacuum pump.

The object of the present invention is to provide a PSA method and a PSA apparatus which can continuously recover the target component in a high concentration with a high recovery percentage. Below, effectiveness of the gas separation method of the present invention when this object is concerned is explained in further detail.

In any method, such as a typical PSA method in which the strong adsorbate is removed and the weak adsorbate is recovered as a product, a reverse PSA method in which the weak adsorbate is removed and the strong adsorbate is recovered as a product, and a Duplex PSA method in which the typical PSA method and the reverse PSA method are combined, a step in which the strong adsorbate is adsorbed and the weak adsorbate is desorbed (below, the step for adsorbing the strong adsorbate is called "adsorption step") is performed under pressurized conditions, and a step in which the weak adsorbate is adsorbed and the strong adsorbate is desorbed (below, the step for desorbing the strong adsorbate is called "regeneration step") is performed under depressurized conditions.

The adsorption step is performed under pressurized conditions, and the flow speed of the gas in the column during the adsorption step is relatively lower than that of the gas in the column during the regeneration step. The regeneration step is performed under depressurized conditions. Therefore, the flow speed of the gas during the regeneration step is relatively larger than that of the gas during the adsorption step. The length of an adsorption band formed in the column in each step varies depending on the difference of the gas flow speed. In the adsorption step in which the gas flow speed is low, the length of the adsorption band is relatively short. In the regeneration step in which the gas flow speed is large, the length of the adsorption band is relatively long. For this reason, recovery of a weak adsorbate in a high concentration can be relatively easy in the Duplex PSA method in which both the strong adsorbate and the weak adsorbate are recovered simultaneously. However, it is very difficult to recover the strong adsorbate in a high concentration in the Duplex PSA method.

Therefore, there is no solution other than the difference of the gas flow speed between in the adsorption step and the regeneration step is as small as possible, in order to recover the strong adsorbate in the same high level concentration as that of the weak adsorbate in the Duplex PSA method. That is, there is no alternative but to make the pressure difference between in the adsorption step and the regeneration step as small as possible. However, this solution requires enlarging the column, and this is not economical. Therefore, there is no other choice other than the concentration of a strong adsorbate is lower than that of the weak adsorbate. In other words, it is impossible to recover the strong adsorbate in the same high concentration as that of the weak adsorbate. In addition, when the mixture gas contains hydrogen and helium, since hydrogen and helium are rarely adsorbed by an adsorbent, they move faster in the column filled with an adsorbent than the other components. Therefore, it is difficult to recover the strong adsorbate without contamination of the weak adsorbate, such as hydrogen and helium.

A counter current purge process is a method in which the strong adsorbate desorbed in the regeneration step is stored in the strong adsorbate storage tank and a column after finishing the adsorption step is rinsed with the strong adsorbate stored in the strong adsorbate storage tank to concentrate the strong adsorbate. In the counter current purge process, in order to recover the strong adsorbate in an extremely high concentration, it is necessary to flow the weak adsorbate to the outside of the column before recovering the strong adsorbate in the strong adsorbate storage tank. That is, it is necessary to flow the entire adsorption band out of the column.

However, the operation for flowing the entire adsorption band out of the column decreases the concentration of the weak adsorbate, or leads to discharge of the mixture gas containing a large amount of both the weak adsorbate and the strong adsorbate. It is impossible to prevent from decreasing the recovery percentage of the strong adsorbate.

In contrast, an improvement of a recovery percentage of the strong adsorbate is easily achieved by preventing from flowing the adsorption band out of the column. In such a case, it is impossible to prevent from decreasing of the concentration of the strong adsorbate. Therefore, it is difficult for the counter current purge process to recover the strong adsorbate and the weak adsorbate in high concentrations at the same time.

In the first PSA method of the present invention, the gas in the material gas storage tank 1 is pressurized by the compressor 4, and introduced into the lower column in the <adsorption step>. The strong adsorbate contained in the gas supplied is adsorbed by the adsorbent filled in the lower column because the operations are performed under pressurized conditions. In other words, the strong adsorbate in the material gas introduced into the material gas storage tank 1 and the strong adsorbate which is returned during the <upper column depressurization step> and <purge regeneration step> are adsorbed by the adsorbent in the lower column.

Figure 6:
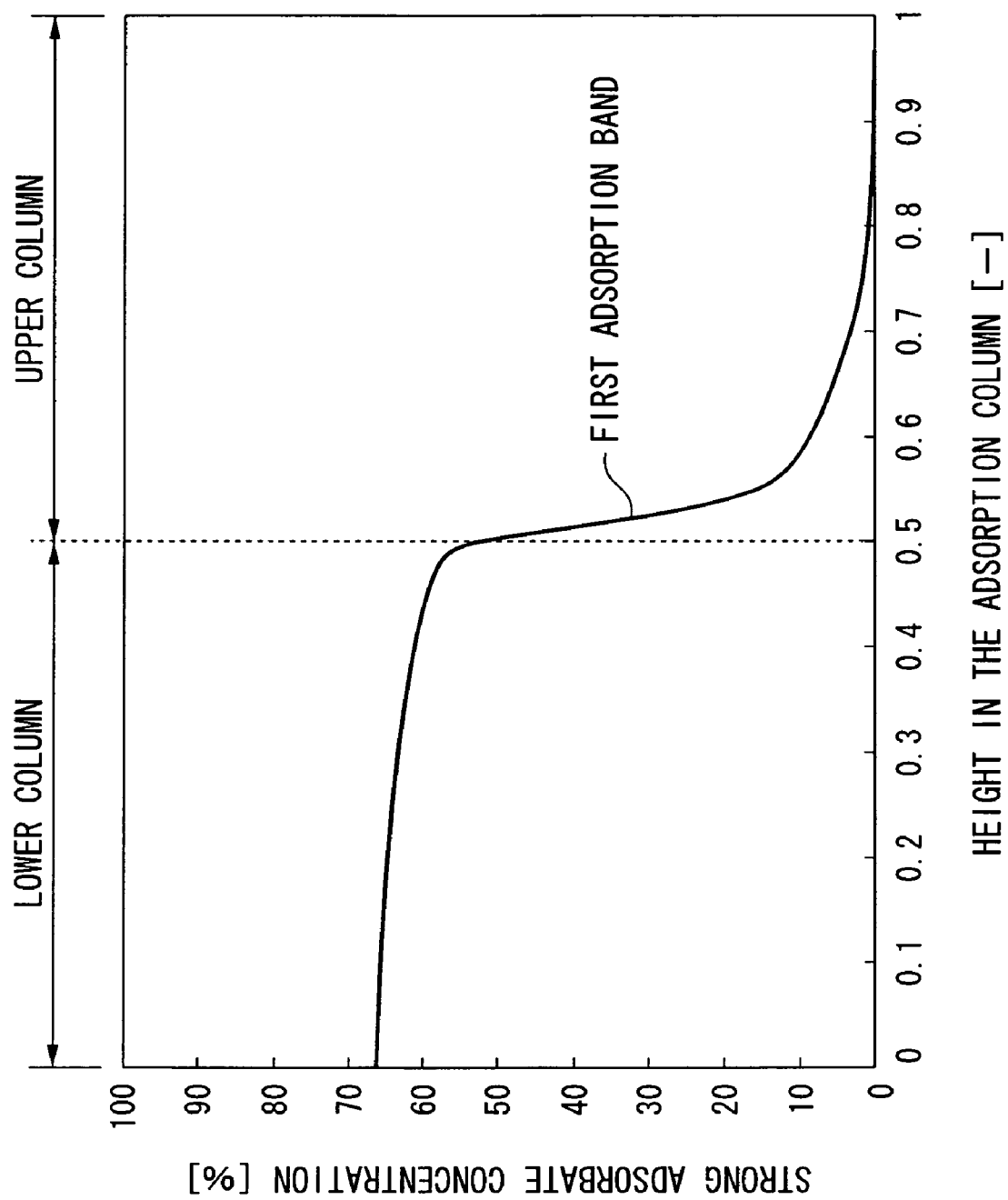
FIG. 6 is a pattern diagram showing a xenon concentration distribution in an adsorbing column filled with an adsorbent at the end of an adsorption step in the first PSA method.

The <adsorption step> is performed until a first adsorption band having the gas concentration of the gas in the material gas storage tank 1 moves from the lower column to the upper column (refer to FIG. 6 which is a pattern diagram showing a xenon concentration distribution in an adsorbing column filled with an adsorbent at the end of the adsorption step). Then, the gas supplied by the compressor 4 is changed to the gas in the strong adsorbate storage tank 2. Then, the <rinse step> in which the strong adsorbate is introduced into the lower column is performed.

Figure 7:
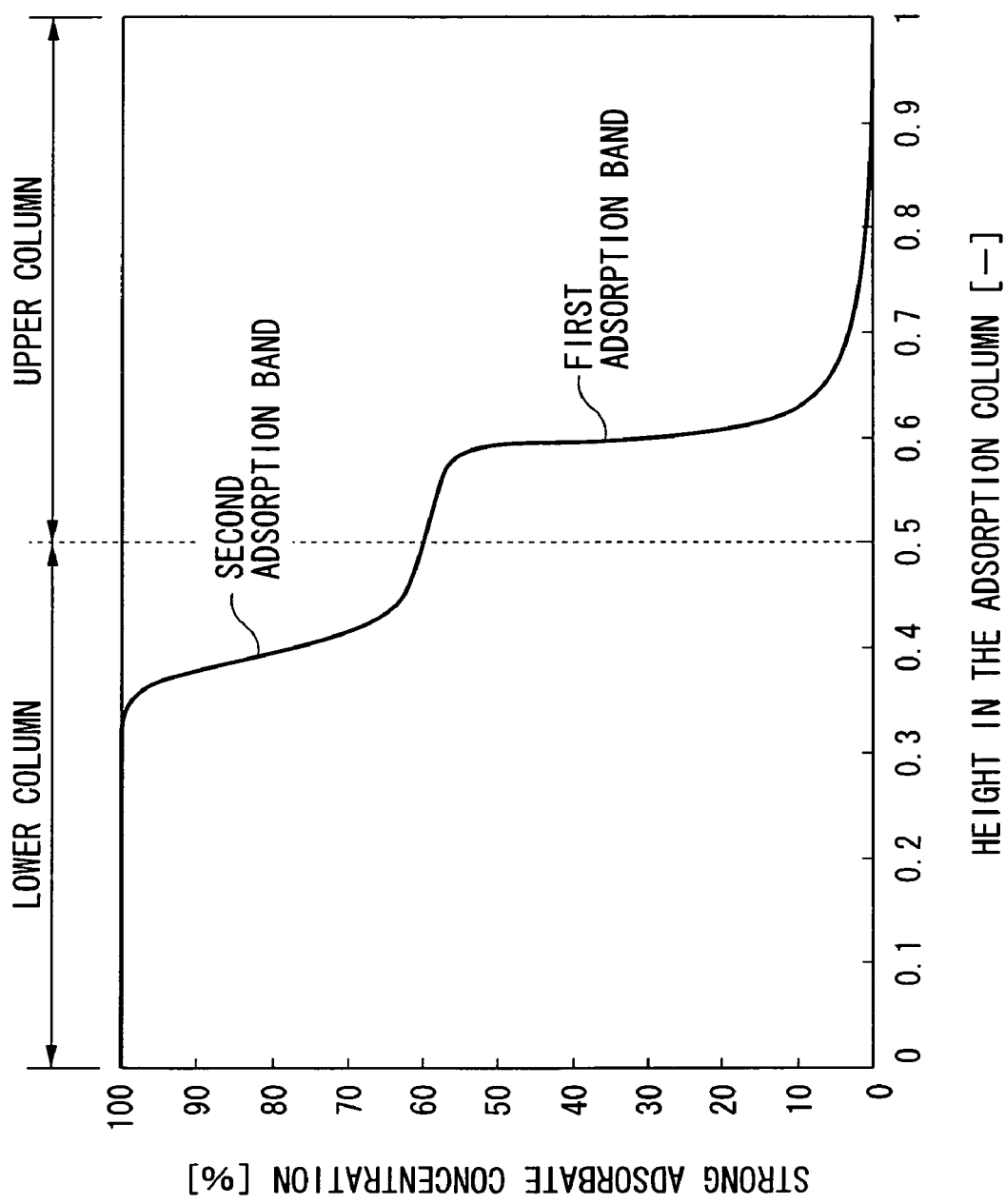
FIG. 7 is a pattern diagram showing a xenon concentration distribution in an adsorbing column filled with an adsorbent at the end of a rinse step in the first PSA method

When the strong adsorbate is introduced, the weak adsorbate adsorbed by the adsorbent in the lower column together with the strong adsorbate and the weak adsorbate in spaces among the adsorbent particles are pushed up to the upper portion of the lower column and the upper column. The <rinse step> is continuously performed until a second adsorption band formed by supplying the strong adsorbate reaches to the upper portion of the lower column (refer to FIG. 7 which is a pattern diagram showing a xenon concentration distribution in an adsorbing column filled with an adsorbent at the end of the rinse step). In the <rinse step>, almost all of the lower column can be filled with the strong adsorbate.

Figure 8:
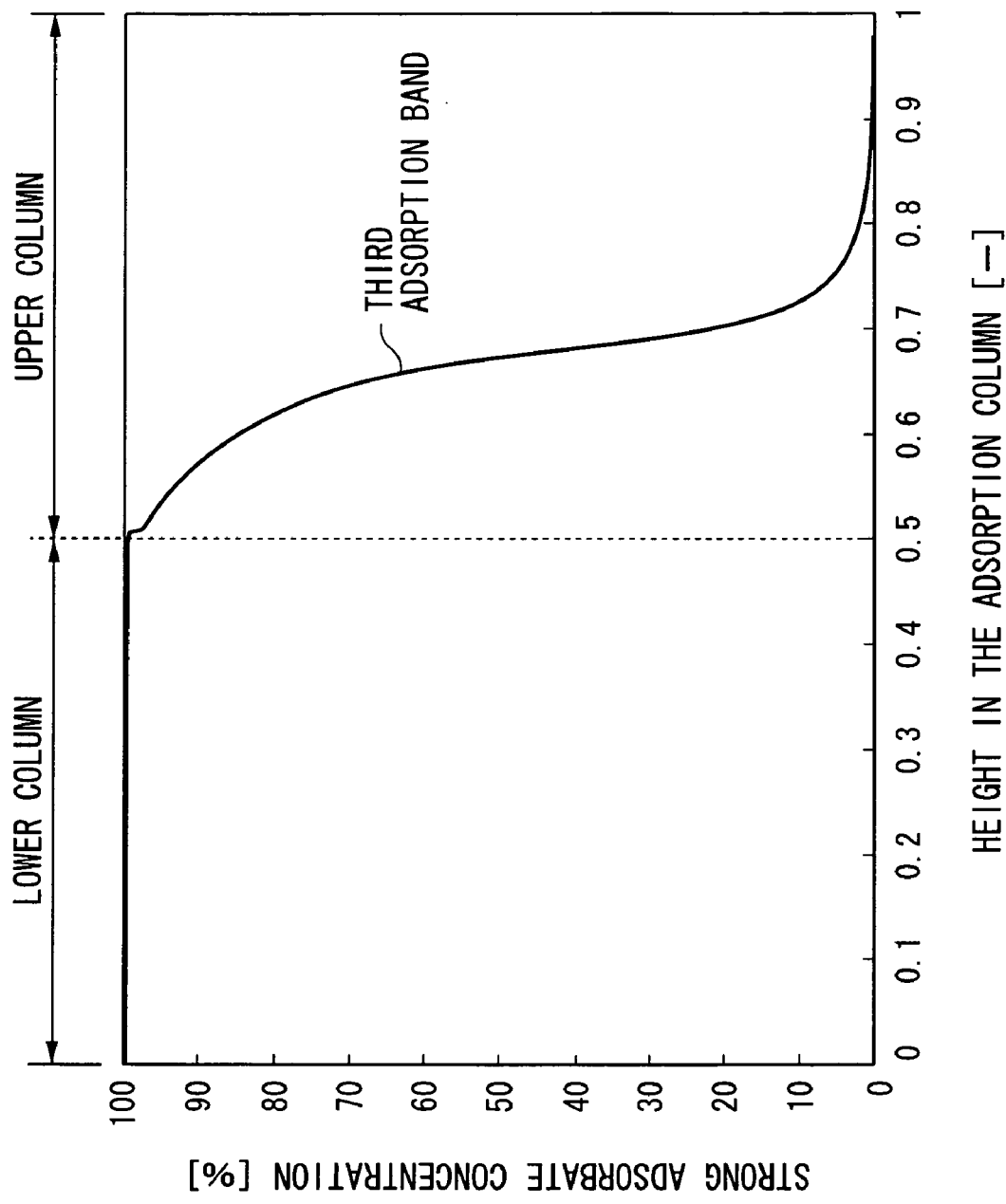
FIG. 8 is a pattern diagram showing a xenon concentration distribution in an adsorbing column filled with an adsorbent at the end of an equalization and depressurization step in the first PSA method.

Subsequently, the <equalization and depressurization step> in which the gas in the upper column is introduced into the other upper column after the regeneration step is performed. Thereby, the gas adsorbed by the adsorbent is desorbed, and the desorbed gas is introduced from the lower column to the upper column, and from the upper column to the other upper column. When an ascending current is formed in these processes, the desorbed strong adsorbate makes the weak adsorbate remaining in the upper portion in the lower column move into the upper column. That is, the lower column is almost saturated with the strong adsorbate (refer to FIG. 8 which is a pattern diagram showing a xenon concentration distribution in an adsorbing column filled with an adsorbent at the end of a equalization and depressurization). The <equalization and depressurization step> is continuously performed until the rapid ascending current combines the first adsorption band and the second adsorption band to form a third adsorption band, and the top portion of the third adsorption band reaches the top portion of the upper column (refer to FIG. 8 which is a pattern diagram showing a xenon concentration distribution in an adsorbing column filled with an adsorbent at the end of the equalization and depressurization).

The entire inside of the lower column is almost saturated with the strong adsorbate by these steps in series. The strong adsorbate adsorbed in the lower column is recovered in the strong adsorbate storage tank 2 by depressurization in the <lower column depressurization step>. A part of the gas recovered in the strong adsorbate storage tank 2 is used as a product gas or discharged as an exhaust gas. The remaining gas is used as a counter current purge gas in the <rinse step>. When recovering the strong adsorbate in the strong adsorbate storage tank, the lower column is entirely saturated with the strong adsorbate, and a purge operation using the weak adsorbate is not performed. Therefore, it is possible to recover the strong adsorbate in an extremely high concentration in the strong adsorbate storage tank.

In the <adsorption step>, <rinse step>, and <equalization and depressurization step>, the strong adsorbate which flows into the upper column 10U (or 11U) is adsorbed by the adsorbent filled in the upper column 10U (or 11U). The strong adsorbate adsorbed in the upper column 10U (or 11U) is entirely recovered in the material gas storage tank 1 in the <upper column depressurization step> and <purge regeneration step>. The same amount of the strong adsorbate as that of the strong adsorbate used from the strong adsorbate storage tank is refilled in the material gas storage tank 1 by introducing the material gas. The strong adsorbate is supplied again together with the weak adsorbate into the lower column 10B (or 11B) in the <adsorption step>.

The weak adsorbate is recovered in the weak adsorbate storage tank 3 from the upper column 10U (or 11U) in the <adsorption step> and <rinse step>. The <adsorption step> and <rinse step> are finished before the first adsorption band reaches the top portion of the lower column 10U (or 11U). Therefore, the weak adsorbate recovered in the weak adsorbate storage tank 3 rarely contains the strong adsorbate. A part of the weak adsorbate recovered in the weak adsorbate storage tank 3 is discharged to the outside of the apparatus as a product gas. The remaining weak adsorbate is used as a counter current purge gas in the <purge regeneration step>. All of the weak adsorbate which is used as the counter current purge gas is recovered in the material gas storage tank 1. The same amount of the weak adsorbate as that of the weak adsorbate used from the weak adsorbate storage tank is refilled in the material gas storage tank 1 by introducing the material gas. The weak adsorbate is supplied again together with the strong adsorbate into the lower column 10B (or 11B) in the <adsorption step>.

As explained above, the first PSA method of the present invention can recover the strong adsorbate and the weak adsorbate in a high concentration at the same time. In addition, only a small amount of the strong adsorbate together with the weak adsorbate discharged is discharged to the outside of the apparatus. In addition, a small amount of the weak adsorbate together with the strong adsorbate discharged is discharged to the outside of the apparatus. Therefore, it is clear that the first PSA method of the present invention can recover the strong adsorbate and the weak adsorbate with an extremely high recovery percentage at the same time.

Moreover, the mixture gas containing xenon as the strong adsorbate and nitrogen as the weak adsorbate is used as a material gas in the embodiment. However, the first PSA method of the present invention is used when the material gas contains plural weak adsorbates. For example, when the material gas contains oxygen and argon in addition to xenon and nitrogen, xenon is recovered in the strong adsorbate storage tank 2, and a mixture gas containing nitrogen, oxygen, and argon which does not contain xenon is recovered in the weak adsorbate storage tank 3.

Since the activated carbon adsorbs substantially the same amount of oxygen and argon as the amount of nitrogen adsorbed, oxygen and argon are concentrated similar to nitrogen.

In addition, the mixture gas contains hydrogen and helium in addition to xenon and nitrogen, hydrogen and helium are not adsorbed by the activated carbon. The separation is easily performed compared to the mixture gas containing oxygen and argon. That is, xenon is recovered in the strong adsorbate storage tank 2, and a mixture gas containing nitrogen, hydrogen, and helium, which are the weak adsorbates, is recovered in the weak adsorbate storage tank 3.

In the embodiment, xenon, which is the strong adsorbate and the target gas, is recovered in a high concentration with a high recovery percentage. However, the scope of the present invention is not limited to this embodiment.

The first PSA method of the present invention can recover the weak adsorbate in a high concentration with a high recovery percentage together with the strong adsorbate. Therefore, when the target component is set to the weak adsorbate, and the removal component is set to the strong adsorbate, it is also possible to recover the weak adsorbate in a high concentration with a high recovery percentage.

For example, a Na-A type zeolite does not readily adsorb krypton, xenon, etc. and easily adsorbs nitrogen, oxygen, argon, etc. When the Na-A type zeolite is used as the adsorbent, krypton and zenon, which are the target components, are recovered in the weak adsorbate storage tank 3, and nitrogen, oxygen, and argon, which are the exhaust gases, are recovered in the strong adsorbate storage tank 2.

Then, the second PSA method of the present invention is explained with reference to figures.

Figure 9:
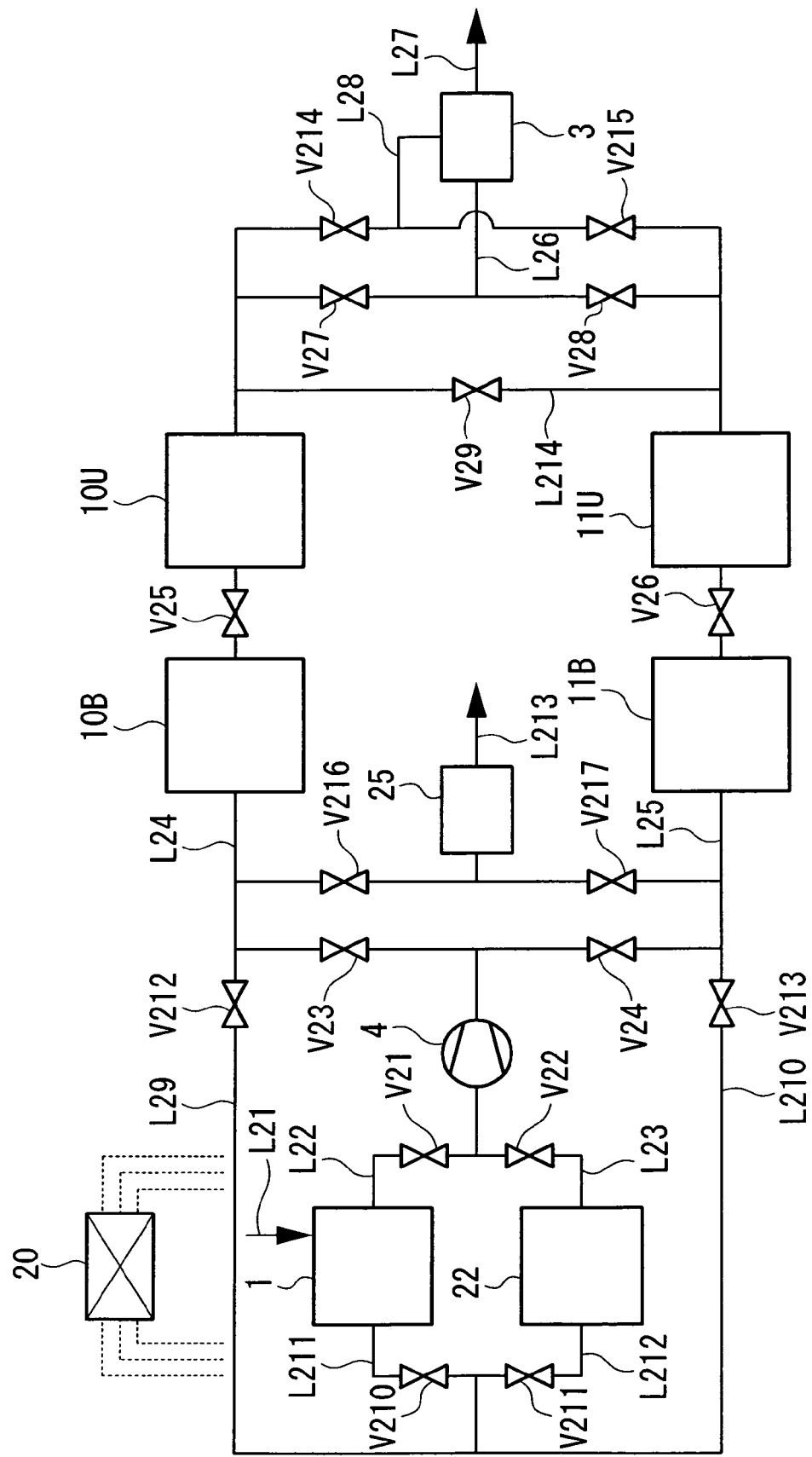
FIG. 9 is a schematic view showing a PSA apparatus used to perform a second PSA method of the present invention.

FIG. 9 is a schematic view showing a second PSA apparatus which can perform a second PSA method of the present invention.

The PSA apparatus has a material gas storage tank 1 for storing a mixture gas containing at least a strong adsorbate which is easily adsorbed by an adsorbent and a weak adsorbate which is not readily adsorbed by the adsorbent; a strong adsorbate low pressure storage tank 22 for storing the strong adsorbate; a weak adsorbate storage tank 3 for storing the weak adsorbate; a compressor 4 for pressurizing gas from the material gas storage tank 1 or the strong adsorbate low pressure component storage tank 22; a strong adsorbate high pressure storage tank 25 for storing the strong adsorbate; four columns which are lower columns 10B and 11B and upper columns 10U and 11U; and a control portion 20.

In FIG. 9, reference L21 denotes a line for introducing the material gas into the material gas storage tank 1.

Reference L22 denotes a line for introducing gas in the material gas storage tank 1 into the compressor 4.

Reference L23 denotes a line for introducing gas in the strong adsorbate low pressure storage tank 22 into the compressor 4.

References L24 and 25 denote lines for introducing gas from the compressor 4 into the lower columns 10B and 11B.

Reference L26 denotes a line for introducing gas from the upper columns 10U and 11U into the weak adsorbate storage tank 3.

Reference L27 denotes a line for supplying the weak adsorbate from the weak adsorbate storage tank 3 to the outside of the apparatus.

Reference L28 denotes a line for introducing the weak adsorbate from the weak adsorbate storage tank 3 into the upper columns 10U and 11U as a counter current purge gas.

References L29 and L210 denote lines for returning gas from the lower columns 10B and 11B into the material gas storage tank 1 or the strong adsorbate low pressure storage tank 22.

Reference L211 denotes a line for returning gas from the lower columns 10B and 11B into the material gas storage tank 1.

Reference L212 denotes a line for returning gas from the lower columns 10B and 11B into the strong adsorbate low pressure storage tank 22.

Reference L213 denotes a line for supplying a strong adsorbate from the strong adsorbate high pressure storage tank 25 into the outside of the apparatus.

Reference L214 denotes a pressure equilibrium line for equalizing pressure between the upper columns 10U and 11U.

The lower columns 10B and 11B and the upper columns 10U and 11U are filled with an adsorbent which easily adsorbs or does not readily adsorb a target component in the material gas, and does not readily adsorb or easily adsorbs components other than the target component.

In addition, the control portion 20 contains a sequencer which operates the steps explained below in a predetermined sequence. The control portion 20 controls sequentially the open-close conditions of each valve, and operate-stop conditions of the compressor 4 shown in FIG. 9.

Below, one embodiment of the PSA method of the present invention is explained referring to the first PSA apparatus. In this embodiment, the target component is xenon, and a main component other than xenon is nitrogen.

An adsorbent filled in the lower columns 10B and 11B and the upper columns 10U and 11U is an activated carbon, which is an equilibrium separation type adsorbent. An activated carbon can adsorb a large amount of xenon (an activated carbon easily adsorbs xenon) and a small amount of nitrogen (an activated carbon does not readily adsorb nitrogen) based on equilibrium adsorption.

Figure 10:
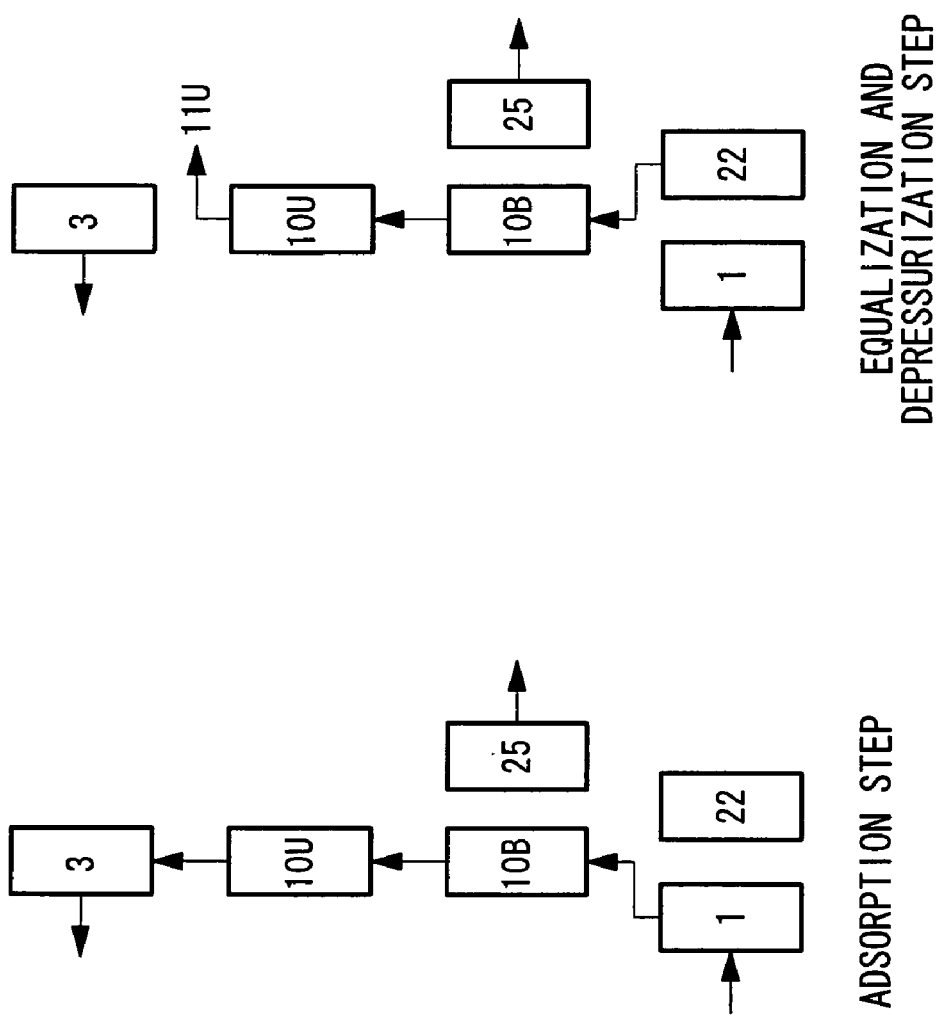
FIG. 10 is a flow chart showing a half cycle of the second PSA method of the present invention.

FIG. 10 shows a half cycle in the PSA method. As shown below, the half cycle has (a) and (b'), that is, the two steps <adsorption step> and <equalization and depressurization step>. The switching condition of the valves in each step is operated as shown in Table 5.

TABLE 5

| Step | | | | | | | | | | |
|---|---|---|---|---|---|---|---|---|---|---|
| 10B and 10U | 11B and 11U | V21 | V22 | V23 | V24 | V25 | V26 | V27 | V28 | V29 |
| Adsorption | Low column depressurization 1 | O | C | O | C | O | C | O | C | C |
| Adsorption | Low column depressurization 2 | O | C | O | C | O | C | O | C | C |
| Adsorption | Upper column depressurization | O | C | O | C | O | O | O | C | C |
| Adsorption | Purge regeneration | O | C | O | C | O | O | O | C | C |
| Rinse, equalization and depressurization | Equalization and pressurization | C | O | O | C | O | O | C | C | O |
| Low column depressurization 1 | Adsorption | O | C | C | O | C | O | C | O | C |
| Low column depressurization 2 | Adsorption | O | C | C | O | C | O | C | O | C |
| Upper column depressurization | Adsorption | O | C | C | O | O | O | C | O | C |
| Purge regeneration | Adsorption | O | C | C | O | O | O | C | O | C |
| Equalization and pressurization | Rinse, equalization and depressurization | C | O | C | O | O | O | C | C | O |

| Step | | | | | | | | | |
|---|---|---|---|---|---|---|---|---|---|
| 10B and 10U | 11B and 11U | V210 | V211 | V212 | V213 | V214 | V215 | V216 | V217 |
| Adsorption | Low column depressurization 1 | O | C | C | C | C | C | C | O |
| Adsorption | Low column depressurization 2 | C | O | C | O | C | C | C | C |
| Adsorption | Upper column depressurization | O | C | C | O | C | C | C | C |
| Adsorption | Purge regeneration | O | C | C | O | C | O | C | C |
| Rinse, equalization and depressurization | Equalization and pressurization | O | C | C | C | C | C | C | C |
| Low column depressurization 1 | Adsorption | O | C | C | C | C | C | O | C |
| Low column depressurization 2 | Adsorption | C | O | O | C | C | C | C | C |
| Upper column depressurization | Adsorption | O | C | O | C | C | C | C | C |
| Purge regeneration | Adsorption | O | C | O | C | O | C | C | C |
| Equalization and pressurization | Rinse, equalization and depressurization | O | C | C | C | C | C | C | C |

In Table, "C" denotes "closed", and "O" denotes "open".

(a') <Adsorption Step>

The mixture gas from the material gas storage tank 1 is pressurized by the compressor 4 via the line 22, and supplied into the lower column 10B via the line L24. Since the lower column 10B and the upper column 10U is connected by opening the valve V25, the lower column 10B and the upper column 10U are pressurized substantially similarly. The mixture gas from the material gas storage tank 1 is a mixture gas containing the material gas introduced from the line L21 and gas discharged from the lower columns 10B or 11B in an upper column depressurization step and a purge regeneration step which are explained below.

As the mixture gas supplied into the lower column 10B reaches toward an upper portion in the lower column 10B, xenon is adsorbed preferentially. Thereby, nitrogen is concentrated in a gas phase. The concentrated nitrogen is introduced from the lower column 10B into the upper column 10U. In the upper column 10U, a small amount of xenon contained in the nitrogen is further adsorbed. After the pressure of the upper column 10U is larger than the pressure in the weak adsorbate storage tank 3, the nitrogen concentrated further in the upper column 10U is introduced into the weak adsorbate storage tank 3 via the line L26. The nitrogen in the weak adsorbate storage tank 3 is discharged from the line L27 to the outside of the apparatus depending on the flow rate of nitrogen contained in the material gas. The remaining nitrogen is used as a counter current purge gas in a purge regeneration step.

(b'+i') <Rinse, Equalization and Depressurization Step>

The kind of gas introduced into the lower column 10B is changed to xenon stored in the strong adsorbate low pressure storage tank 22 by closing the valve V21 and opening the valve V22. Nitrogen co-adsorbed by the adsorbent in the lower column 10B and nitrogen in spaces among the adsorbent particles are pushed into the upper column 10U by introducing xenon in the strong adsorbate low pressure storage tank 22 into the lower column 10B. Thereby, the inside of the lower column 10B is in a saturated adsorption condition by xenon.

In this period of time, the lower column 10B and the upper column 10U is depressurized by introducing nitrogen into the other upper column 11U from the upper column 10U via the equalization line L214. Thereby the pressure in the lower column 11B after finishing the purge regeneration step and the upper column 11U is equalized. At this time, the flow rate of gas for equalizing pressure from the upper column 10U is adjusted using a flow rate control valve and an orifice such that when the (b'+i') the rinse, equalization and depressurization step is finished, pressure equalization between the columns is finished simultaneously.

Figure 11:
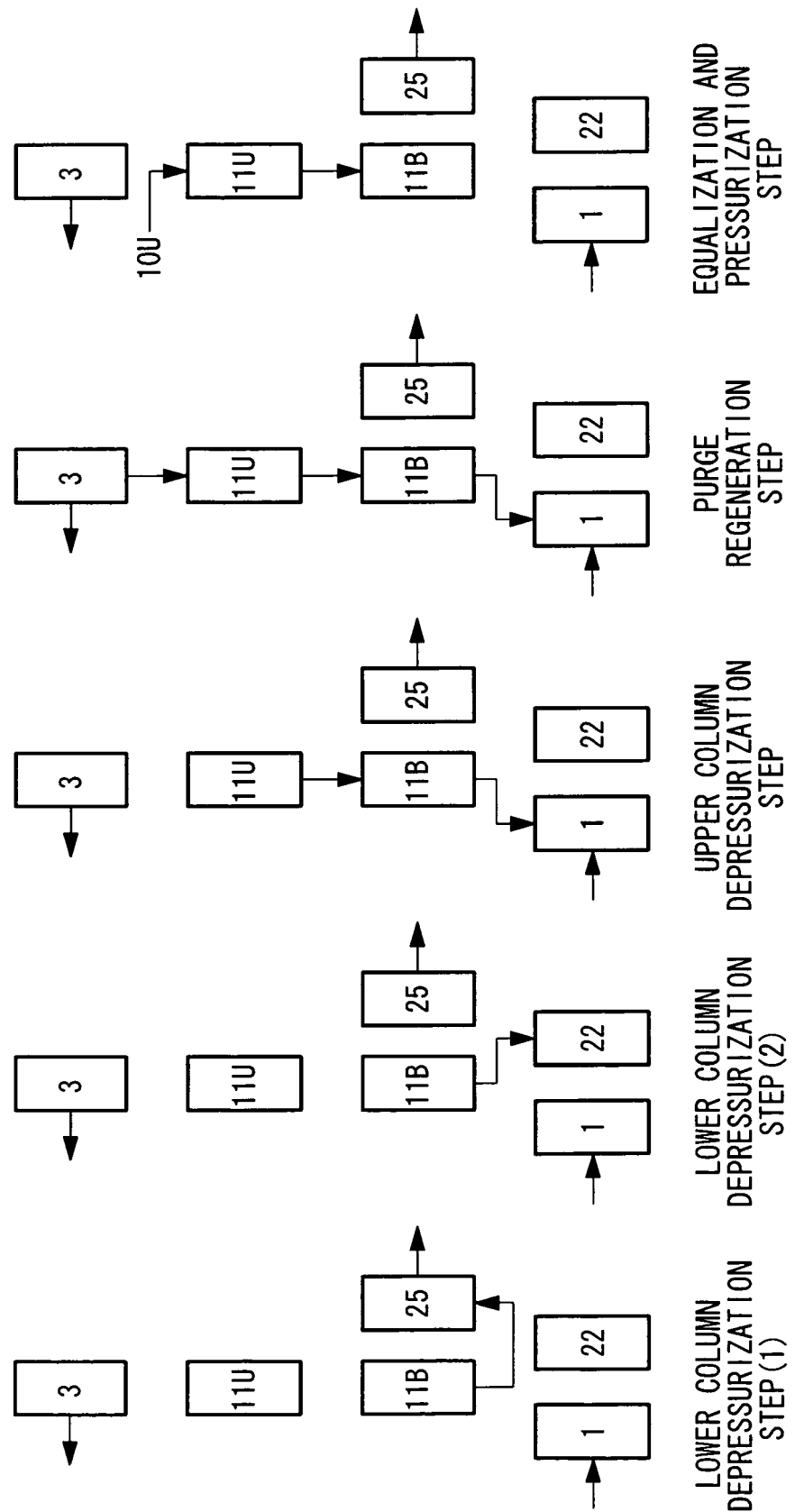
FIG. 11 is a flow chart showing another half cycle of the second PSA method of the present invention

FIG. 11 shows the other half cycle in the PSA method. As shown below, the other half cycle has (c'), (d'), (e'), and (j'), that is, the four steps <lower column depressurization step>, <upper column depressurization step>, <purge regeneration step>, and <equalization and pressurization step>.

Moreover, during the lower column 10B and the upper column 10U perform the two steps which are explained above and shown in FIG. 10, the lower column 11B and the upper column 11U perform the four steps shown in FIG. 11. The switching condition of the valves in each step shown in FIG. 11 is operated as shown in Table 5.

(c') <Lower Column Depressurization Step 1>

The valves V24 and V26 are closed, and the valve V217 is opened. Thereby, the xenon adsorbed in the lower column 10B during the steps of the (a') to (b'+i') is desorbed due to a pressure difference between the lower column 11B and the strong adsorbate high pressure storage tank 25, and recovered in the strong adsorbate high pressure storage tank 25 via the line L25 and valve 217. These processes increase the pressure in the strong adsorbate high pressure storage tank 25 to the same pressure as in the lower column 11B.

The xenon recovered in the strong adsorbate high pressure storage tank 25 is used from the line L213 as a product depending on the flow rate of xenon contained in the material gas. The pressure in the strong adsorbate high pressure storage tank 25 decreases by the usage of the product gas. However, it is possible to maintain constantly the product pressure desired by customers without a compressor by adjusting the volume of the strong adsorbate high pressure storage tank 25 so as to maintain the product pressure desired.

(c'2) <Lower Column Depressurization Step 2>

Then, the valves V210 and V217 are closed, and the valves V211 and V213 are opened. Thereby, the xenon adsorbed and remaining in the lower column 10B is recovered in the strong adsorbate low pressure storage tank 22.

The xenon recovered in the strong adsorbate low pressure storage tank 22 is used as a counter current purge gas in the (b'+i') <rinse, equalization and depressurization step>. In this period of time, the valves V26, V28, and V29 are closed, and the upper column 11U is in a resting state.

(d') <Upper Column Depressurization Step>

The valve V211 is closed and the valves V26 and V210 are opened. Then, a pressure difference is generated between the upper column 11U in a resting state during the (c') <lower column depressurization step> and the depressurized lower column 11B. The gas in the upper column 11U flows into the lower column 11B. The gas introduced into the lower column 11B purges the inside of the lower column 11B, and is recovered in the material gas storage tank 1 via the lines L210 and L211. The gas recovered in the material gas storage tank 1 is mixed with the material gas introduced from the line L21, and then supplied again into the upper column during the (a') <adsorption step>.

(e') <Purge Regeneration Step>

The valve V215 is opened. The nitrogen stored in the weak adsorbate storage tank 3 is introduced into the upper column 11U, via the line L28 as a counter current purge gas. The nitrogen introduced into the upper column 11U displaces and desorbs xenon adsorbed as the nitrogen reaches toward the bottom of the upper column 11U. Gas containing a large amount of xenon desorbed is recovered in the material gas storage tank 11 via the lower column 11B, and the lines L210 and L211.

Similar to the (d') <upper column depressurization step>, the gas recovered in the material gas storage tank 1 is mixed with the material gas introduced from the line L21, and supplied again into the lower column in the (a') <adsorption step>.

Here, the nitrogen discharged from the upper column 10U in the (a') <adsorption step> may be directly introduced into the upper column in the (e') <purge regeneration step> without passing through the weak adsorbate storage tank 3 as a counter current purge gas.

(j') <Equalization and Depressurization Step>

The valves V213 and V215 are closed, and the valve V29 is opened. Thereby the gas in the upper column 10U is introduced into the upper column 11U. The nitrogen concentration of the gas introduced into the upper column 11U is high. Therefore, it is possible to push down the xenon in the upper column 11U into the bottom portion of the upper column and the lower column 11B (equalization and pressurization operation).

Nitrogen and xenon can be continuously concentrated by performing repeatedly the six steps explained above in the upper column 10B and the lower column 10U, and the lower column 11B and the upper column 11U. During the (a') <adsorption step> to (b'+i') <rinse, equalization and depressurization step> in the lower column 10B and the upper column 10U, the (c') <lower column depressurization step> to (d') <upper column depressurization step> to (e') <purge regeneration step> to (j') <equalization and pressurization step> are performed in the lower column 11B and the upper column 11U.

During the (c') <lower column depressurization step> to (d') <upper column depressurization step> to (e') <purge regeneration step> to (j') <equalization and pressurization step> in the lower column 10B and the upper column 10U, (a') <adsorption step> to (b'+i') <rinse, equalization and depressurization step> are performed in the lower column 11B and the upper column 11U.

Moreover, introduction of the material gas from the line L21, discharge of nitrogen from the line L27, and flowing out of xenon from the line L213 do not depend on the steps and are continuously performed.

Table 6 shows one example of the time ratio in each step explained above. In this example, a one cycle time is 300 seconds.

TABLE 6

| Time in step (second) | Lower column 10B and upper column 10U | Lower column 11B and upper column 11U |
|---|---|---|
| 0 to 10 | (a') adsorption step | (c') lower column depressurization step 1 |
| 10 to 65 | ↓ | (c') lower column depressurization step 2 |
| 65 to 130 | ↓ | (d') upper column depressurization step |
| 130 to 200 | ↓ | (e') purge regeneration step |
| 200 to 300 | (b' + i') rinse, equalization and depressurization step | (j') equalization and pressurization step |
| 300 to 310 | (c') lower column depressurization step 1 | (a') adsorption step |
| 310 to 365 | (c') lower column depressurization step 2 | ↓ |
| 365 to 430 | (d') upper column depressurization step | ↓ |
| 430 to 500 | (e') purge regeneration step | ↓ |
| 500 to 600 | (j') equalization and pressurization step | (b' + i') rinse, equalization and depressurization step |

In order to improve the recovery percentage while maintaining the high purity of the strong adsorbate, the time percentage of the equalization and depressurization step relative to the cycle time is important. When the lower column 10B and the upper column 10U are in the equalization and depressurization step, the other lower column 11B and upper column 11U are in the equalization and pressurization step. Therefore, in other words, the time percentage of the equalization and pressurization step relative to the cycle time is important. As shown in the results of Examples below, when the time percentage of the equalization step is in a range from 10 to 50%, it is possible to maintain a high purity and a high recovery percentage.

As explained above, the object of the present invention is to provide a PSA method which can recover continuously the target component in a high concentration with a high recovery percentage. Below, when this object is concerned, effectiveness of the second PSA method of the present invention is explained in further detail.

In the second PSA method of the present invention, the gas in the material gas storage tank 1 is pressurized by the compressor 4, and introduced into the lower column in the <adsorption step>. The strong adsorbent contained in the gas supplied is adsorbed by the adsorbent filled in the lower column because the operations are performed under pressurized conditions. In other words, the strong adsorbate in the material gas introduced into the material gas storage tank 1 and the strong adsorbate which is returned during the <upper column depressurization step> and <purge regeneration step> are adsorbed by the adsorbent in the lower column.

Figure 12:
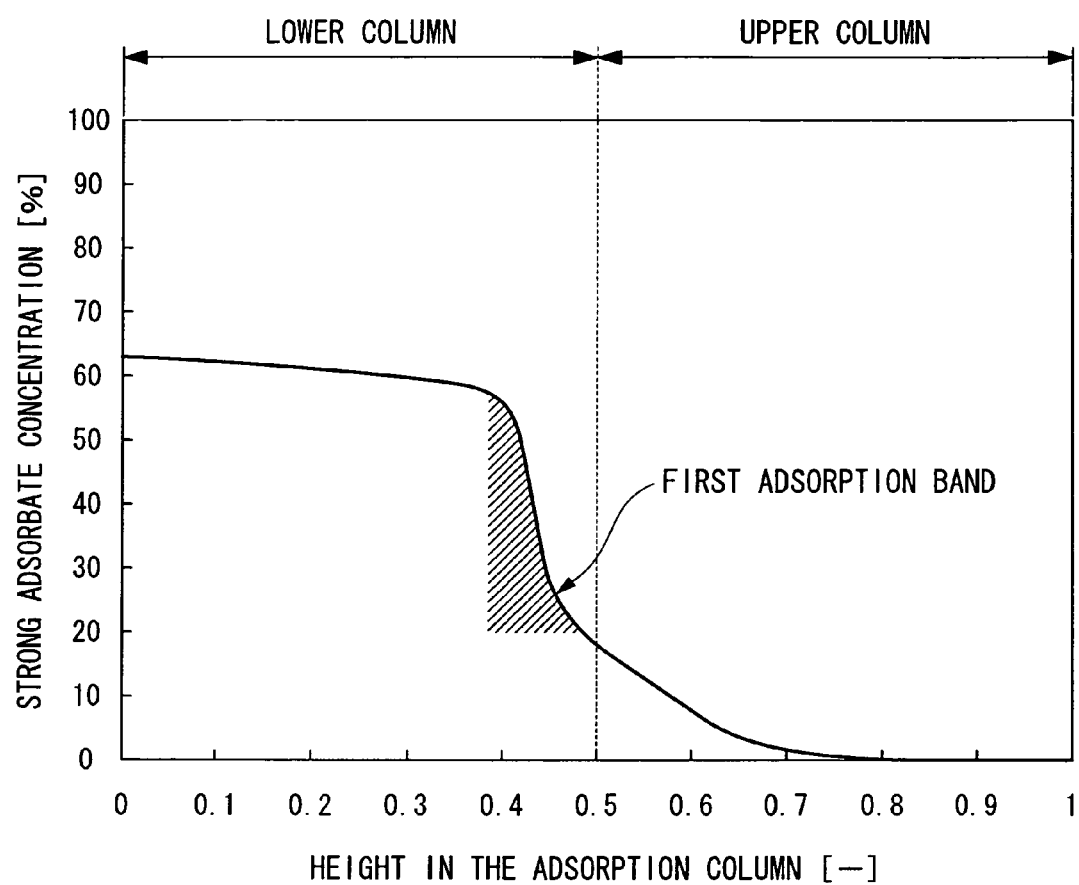
FIG. 12 is a pattern diagram showing a xenon concentration distribution in an adsorbing column filled with an adsorbent at the end of an adsorption step in the second PSA method.
Figure 13:
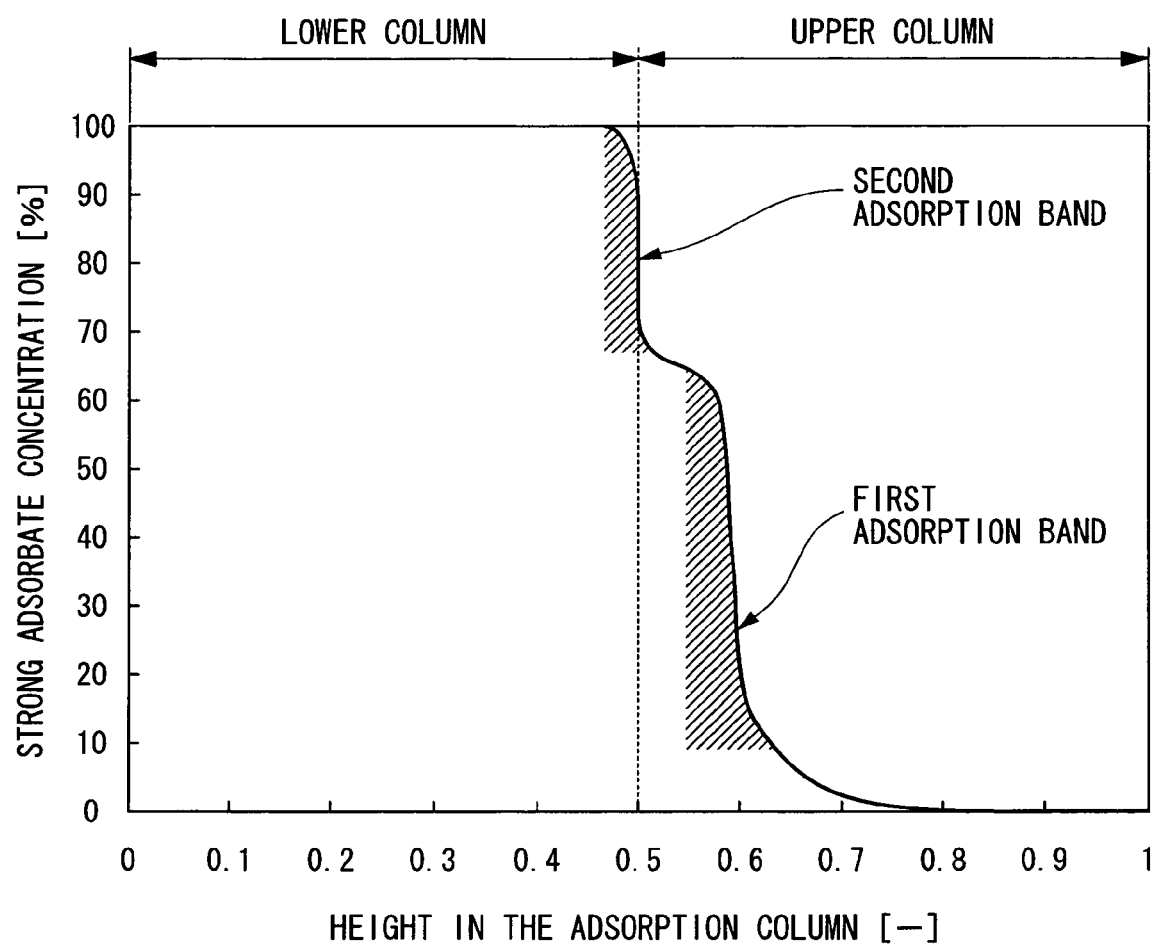
FIG. 13 is a pattern diagram showing a xenon concentration distribution in an adsorbing column filled with an adsorbent at the end of an equalization and depressurization in the second PSA method.

The <adsorption step> is performed until a first adsorption band formed by the gas in the material gas storage tank 1 reaches from the lower column to the upper column as shown in FIG. 12. Moreover, the longitudinal axis in FIG. 12 denotes the concentration (volume) of the strong adsorbate in the gas phase in the column. In FIG. 12, the xenon concentration in the gas stored in the material gas storage tank 1 is about 60%.

Then, the gas supplied by the compressor 4 is changed to the gas in the strong adsorbate low pressure storage tank 22, and the strong adsorbate is supplied into the lower column. At the same time, the <equalization and depressurization step> in which the strong adsorbate is introduced into the other upper column after finishing the regeneration step is performed.

When the strong adsorbate is introduced, the weak adsorbate co-adsorbed by the adsorbent in the lower column together with the strong adsorbate and the weak adsorbate in spaces among the adsorbent particles are pushed up to the upper portion of the lower column. When a flow rate adjuster valve, or an orifice is provided with the equalization line and the flow rate of gas for the equalization is adjusted, the lower column and the upper column are depressurized gradually. The pressure in the upper and lower column becomes the same pressure as that after the regeneration step. The <equalization and depressurization step> is continuously performed until a second adsorption band formed by supplying the strong adsorbate passes completely through the lower column. In the <equalization and depressurization step>, the lower column can be filled completely with the strong adsorbate.

At this time, the product gas, which is the weak adsorbate, is recovered from the upper portion of the upper column in the adsorption step into the weak adsorbate storage tank 3. In order to recover the weak adsorbate, which is the product gas, in a high concentration, it is preferable to maintain the conditions in that there is no strong adsorbate at the top portion of the upper column. In other words, it is preferable to operate such that the first and second adsorption bands formed in the adsorption step and the equalization and depressurization step do not reach the top portion of the upper column.

The product gas, which is the strong adsorbate, is recovered by depressurizing the lower column filled with the strong adsorbate in the equalization and depressurization step. In order to recover the strong adsorbate, which is the product gas, in a high concentration, the conditions in that the lower column is completely filled with the strong adsorbate are preferable. In other words, it is preferable to operate such that the first and second adsorption bands formed in the adsorption step and the equalization and depressurization step move completely into the upper column.

That is, in order to improve the concentration of the weak adsorbate, it is preferable that the progress of the adsorption bands be slow, and to operate such that the adsorption bands 1 and 2 do not reach the top portion of the upper column. In contrast, in order to improve the concentration of the strong adsorbate, it is preferable that the progress of the adsorption bands be fast, and to operate such that the adsorption bands 1 and 2 pass completely from the lower column to the upper column. Therefore, it is very difficult to improve the concentration of the strong adsorbate and the weak adsorbate at the same time.

In the second PSA method of the present invention, the gas in the strong adsorbate storage tank is supplied in the equalization and depressurization step, and the gas flows out from the upper column and is introduced into the other upper column after the regeneration at the same time. Thereby, the upper column and the lower column are depressurized gradually. When the strong adsorbate is supplied under the reduced pressure conditions, it is possible to improve the progress speed of the second adsorption band in the lower column. Due to this, the lower column is easily saturated with the strong adsorbate.

In addition, the flow of the gas from the upper portion of the upper column is adjusted by the valve or the orifice. Therefore, the rapid ascending flow is not generated in the lower and upper columns. The first and second adsorption bands are always not disturbed. The weak adsorbate and the strong adsorbate can be recovered at the same time in a high concentration.

In addition, the strong adsorbate concentrated in the lower column is recovered by depressurizing the lower column after the equalization and depressurization step. When the entire strong adsorbate in the lower column is recovered in the strong adsorbate low pressure storage tank 22, in order to supply the strong adsorbate as a product gas, a further pressurization device, such as a compressor, is required. However, the strong adsorbate high pressure storage tank 25 is provided, and the equalization step for equalizing the pressure in the lower column after the equalization and depressurization step and the pressure in the strong adsorbate high pressure storage tank 25 is also provided in the PSA method of the present invention. Therefore, a further pressurization device, such as a compressor, is not necessary.

In particular, the method is effective when the material gas contains a small amount of the strong adsorbate. Since the amount of the strong adsorbate, which is the product gas to be supplied to the outside of the apparatus, is small, it is possible to maintain a suitable pressure of the product gas by only providing the strong adsorbate high pressure storage tank 25 in a small size.

In this embodiment, the component is recovered in the strong adsorbate high pressure storage tank 25 in the lower column depressurization step. However, it is also possible to recover the strong adsorbate in the strong adsorbate high pressure storage tank 25 in the equalization and depressurization step. Specifically, while the gas in the strong adsorbate low pressure storage tank 22 is pressurized by the compressor 4, and supplied into the lower column, the valve V216 or V217 is opened. Thereby, the strong adsorbate pressurized by the compressor 4 can be recovered in the strong adsorbate high pressure storage tank 25.

As explained above, the PSA method of this embodiment can recover the strong adsorbate and the weak adsorbate in a high concentration at the same time. In addition, it is not necessary to provide a pressurization device for supplying the strong adsorbate to the outside of the apparatus. Therefore, the strong adsorbate and the weak adsorbate are recovered in an extremely high concentration at the same time, in addition to reduction of the initial cost for the device.

Moreover, when a speed separation type adsorbent such as a CMS is used, nitrogen is recovered in the strong adsorbate high pressure storage tank 25, and xenon is recovered in the weak adsorbate storage tank 3.

In addition, when the material gas contains $CO_2$, $H_2O$, or $CK_4$, it is preferable that a pretreatment be performed using another PSA apparatus. It is also preferable that since these gases flow out with the product xenon, a post-treatment be performed to remove these gases. When a post-treatment is performed, a small removing apparatus can be used.

Example 1

As Example 1, xenon was separated from a material gas containing xenon and nitrogen using the first PSA apparatus shown in FIG. 1.

As the lower columns 10B and 11B, and the upper columns 10U and 11U, a cylindrical container having an inner diameter of 108.3 mm and a height of 500 mm in which 2.0 kg of activated carbon was filled was used. The compressors 4 and 5 have a volume of 40 L/min and 20 L/min (the flow rate [L/min.] is a corresponding value under the conditions of 1 atom and 0° C.) respectively. The apparatus was operated such that the cycle time was 500 seconds, and the time in each step is shown in Table 7.

The flow rate of the material gas introduced into the material gas storage tank 1 was 2 L/min. The material gas composition was 50% by volume of xenon and 50% by volume of nitrogen. The flow rate of xenon recovered from the strong adsorbate storage tank 2 was 1 L/min. The flow rate of nitrogen recovered from the weak adsorbate storage tank 3 was 1 L/min.

TABLE 7

|  | Lower column 10B and Upper column 10U | Lower column 11B and Upper column 11U |
| --- | --- | --- |
| 0 to 10 s | (a) adsorption step | (c) lower column depressurization step |
| 10 to 50 s | ↓ | ↓ |
| 50 to 100 s | ↓ | (d) upper column depressurization step |
| 100 to 180 s | ↓ | (e) purge regeneration step |
| 180 to 240 s | (b) rinse step | ↓ |
| 240 to 250 s | (i) equalization and depressurization step | (j) equalization and pressurization step |
| 250 to 260 s | (c) lower column depressurization step | (a) adsorption step |
| 260 to 300 s | ↓ | ↓ |
| 300 to 350 s | (d) upper column depressurization step | ↓ |
| 350 to 430 s | (e) purge regeneration step | ↓ |

TABLE 7-continued

|  | Lower column 10B and Upper column 10U | Lower column 11B and Upper column 11U |
| --- | --- | --- |
| 430 to 490 s | ↓ | (b) rinse step |
| 490 to 500 s | (j) equalization and pressurization step | (i) equalization and depressurization step |

When the separation was continuously carried out for 24 hours under the conditions, it was confirmed that the concentration of nitrogen discharged from the line L7, and the concentration of xenon discharged from the line L13 were almost fixed. That is, it was confirmed that the apparatus reached a circularly static state. At this time, the concentration of nitrogen and xenon was both 99.97%. This also means that the recovery percentage of nitrogen and xenon was 99.97%.

It was confirmed that nitrogen which is a weak adsorbate and xenon which is a strong adsorbate were both recovered in a high concentration with a high recovery percentage.

Example 2

As Example 2, xenon was separated from a material gas containing xenon, nitrogen, oxygen, argon, and hydrogen using the first PSA apparatus shown in FIG. 1.

The flow rate of the material gas introduced into the material gas storage tank 1 was 2.1 L/min. The material gas composition was 23.8% by volume of xenon, 23.8% by volume of nitrogen, 23.8% by volume of argon, 4.8% by volume of hydrogen, and oxygen as the remainder.

The flow rate of xenon recovered from the strong adsorbate storage tank 2 was 0.5 L/min. The flow rate of the mixture gas recovered from the weak adsorbate storage tank 3 was 1.6 L/min.

When the separation was continuously carried out for 24 hours under the same conditions as in Example 1 based on the time sequence shown in Table 7, the concentration of xenon contained in the mixture gas discharged from the line L7 was about 900 ppm, and the concentrations of nitrogen, oxygen, and argon contained in xenon discharged from the line L13 were all about 50 ppm. However, hydrogen was not detected in xenon.

Therefore, the concentration of xenon recovered was about 99.98%, and the recovery percentage thereof was 99.7%.

It was confirmed that when the material mixture contains plural kinds of weak adsorbates, xenon, which is the target component, could be recovered in a high concentration with a high recovery percentage.

Example 3

As Example 3, xenon was separated from a material gas containing xenon and nitrogen using the second PSA apparatus shown in FIG. 9.

As the lower columns 10B and 11B, and the upper columns 10U and 11U, a cylindrical container having an inner diameter of 83.1 mm and a height of 500 mm in which 1.5 kg of activated carbon was filled was used. The compressor 4 has a volume of 25 L/min (the flow rate [L/min.] is a corresponding value under the conditions of 1 atom and 0° C.). The strong adsorbate high pressure storage tank 25 has a volume of 2.5 L. The apparatus was operated such that the cycle time was 600 seconds, and the time in each step is shown in Table 6.

The flow rate of the material gas introduced into the material gas storage tank 1 was 3 L/min. The material gas composition was 10% by volume of xenon and 90% by volume of nitrogen. The flow rate of xenon recovered from the strong adsorbate high pressure storage tank 25 was 0.3 L/min. The flow rate of nitrogen recovered from the weak adsorbate storage tank 3 was 2.7 L/min.

When the separation was continuously carried out for 24 hours under the conditions, it was confirmed that the concentration of nitrogen discharged from the line L27 and xenon discharged from the line L213 were almost fixed. That is, it was confirmed that the apparatus reached a circularly static state. At this time, the concentration of xenon was 110 ppm, and the concentration of nitrogen contaminated in xenon was 1,000 ppm. This means that the recovery percentage of the product xenon having a concentration of 99.9% was 99.9%.

The pressure in the strong adsorbate high pressure storage tank 25 was maintained in a range from 380 kPa (when the (c'1) lower column depressurization step 1 was started) to 435 kPa (when the (c'1) lower column depressurization step 1 was finished).

It was confirmed that xenon was recovered with an extremely high recovery percentage by using the PSA method of the present invention. In addition, it was also confirmed that the pressure of the product xenon, which is the strong adsorbate, could be maintained at 380 kPa or greater.

Example 4

As Example 4, the influence of the time in the equalization and depressurization step and the equalization and pressurization step was considered using the same equipment as used in Example 3. The cycle time was adjusted to 600 seconds for all the conditions, and the time for equalization was varied as a parameter. Moreover, when the time for equalization is short, the amount of the counter current purge gas from the strong adsorbate low pressure storage tank 22 becomes too small (because the inside of the lower column was not saturated with the strong adsorbate), supplying the material gas from the material gas storage tank 1 was stopped in the adsorption step and the counter current purge gas from the strong adsorbate low pressure storage tank 22 was supplied arbitrarily.

The recovery percentage of the product xenon having a purity of 99.8% is shown in Table 8. It is clear that when the time for equalization was short, the recovery percentage of xenon dramatically decreased. In order to recover xenon with a high recovery, it is important to lengthen the time for equalization, that is, adjust the time for equalization to 10 to 50% relative to the cycle time.

TABLE 8

| Time for equalization (second) | Recovery percentage of the product xenon |
| --- | --- |
| 10 | 95.60% |
| 20 | 98.21% |
| 30 | 99.90% |
| 60 | 99.98% |
| 90 | 95.95% |

INDUSTRIAL APPLICABILITY

The PSA method and the PSA apparatus of the present invention can recover and use circularly highly valuable gas such as xenon in a high concentration with a high recovery percentage from the mixture gas which is supplied and used in manufacturing equipment for semiconductor products or display devices and discharged. When the PSA apparatus of the present invention and the manufacturing equipment for semiconductor products or display devices are combined to make a cycle, the cost for expensive atmospheric gas used in the manufacturing equipment for semiconductor devices, etc. can be dramatically reduced.

The invention claimed is:

1. A pressure swing adsorption method in which a mixture gas containing at least two main components is used as a material gas, an adsorbent which easily adsorbs at least one main component in the material gas and does not readily adsorb at least another main component in the material gas is used, the method uses a separation apparatus comprising a lower column and a upper column which are filled with the adsorbent, a material gas storage tank for storing the material gas to be introduced into the lower column, a strong adsorbate storage tank for storing a main component which is easily adsorbed by the adsorbent, and a compressor for pressurizing gas from the material gas storage tank or the strong adsorbate storage tank and introducing into the lower column, and the strong adsorbate which is easily adsorbed by the adsorbent and the weak adsorbate which is not readily adsorbed by the adsorbent are recovered, wherein the method comprises:

a step (a) in which the gas in the material gas storage tank is pressurized and introduced into the lower column, the strong adsorbate in the material gas is adsorbed by the adsorbent, gas from the lower column which contains a less amount of the strong adsorbate is introduced into the upper column, the strong adsorbate contained in the gas is adsorbed by the adsorbent in the upper column, and the weak adsorbate which flows from the upper column is recovered;

a step (b) in which the gas in the strong adsorbate storage tank is pressurized by the compressor and introduced into the lower column, the weak adsorbate co-adsorbed by the adsorbent in the lower column and the weak adsorbate remaining in space among the adsorbent are led into the upper column, the strong adsorbate contained in the gas led out from the lower column is adsorbed by the adsorbent in the upper column, and the weak adsorbate which flows from the upper column is recovered;

a step (c) in which the lower column is depressurized, the strong adsorbate adsorbed by the adsorbent filled in the lower column is desorbed, and the desorbed strong adsorbate is recovered in the strong adsorbate storage tank;

a step (d) in which the upper column is depressurized, the weak adsorbate adsorbed by the adsorbent in the upper column is desorbed, the desorbed gas is introduced into the lower column, and gas which flows from the lower column is recovered in the material gas storage tank; and a step (e) in which the weak adsorbate recovered in the steps (a) and (b) is introduced into the upper column as a counter current purge gas, the strong adsorbate adsorbed by the adsorbent in the upper column is displaced and desorbed, gas which flows from the upper column is introduced into the lower column, the strong adsorbate adsorbed by the adsorbent in the lower column is displaced and desorbed by the gas introduced into the lower column, and gas which flows from the lower column is recovered in the material gas storage tank; and these steps (a) to (e) are sequentially repeated based on a predetermined sequence, and the strong adsorbate and the weak adsorbate in the material gas are simultaneously recovered in a high concentration with a high recovery percentage.

2. A pressure swing adsorption method according to claim 1, wherein the step (b) uses at least two lower columns and at least two upper columns, and contains the following step (i):
a step (i) in which the upper column after finishing the step (b) and the other upper column after finishing the step (e) are connected, gas in the upper column after finishing the step (b) is introduced into the other upper column after finishing the step (e), gas in the lower column after finishing the step (b) is introduced into the upper column after finishing the step (b), and gas in the strong adsorbate storage tank is introduced into the lower column, and that the step (e) uses at least two lower columns and at least two upper columns, and contains the following step (j):
a step (j) in which the upper column after finishing the step (e) and the other upper column after finishing the step (b) are connected, gas in the upper column after finishing the step (b) is introduced into the other upper column after finishing the step (e), gas in the upper column after finishing the step (e) is introduced into the lower column after finishing the step (e).

3. A pressure swing adsorption method according to claim 1, wherein the step (b) uses at least two lower columns and at least two upper columns, and contains the following step (g):
a step (g) in which the upper column after finishing the step (a) and the other upper column after finishing the step (e) are connected, gas in the upper column after finishing the step (a) is introduced into the other upper column after finishing the step (e), gas in the lower column after finishing the step (a) is introduced into the upper column after finishing the step (a), and gas in the strong adsorbate storage tank is introduced into the lower column, and that the step (e) uses at least two lower columns and at least two upper columns, and contains the following step (j):
a step (j) in which the upper column after finishing the step (e) and the other upper column after finishing the step (b) are connected, gas in the upper column after finishing the step (b) is introduced into the other upper column after finishing the step (e), gas in the upper column after finishing the step (e) is introduced into the lower column after finishing the step (e).

4. A pressure swing adsorption method according to claim 1, wherein the adsorbent is an adsorbent which separates the strong adsorbate and the weak adsorbate based on a difference between an equilibrium adsorption amount.

5. A pressure swing adsorption method according to claim 4, wherein the adsorbent which separates the strong adsorbate and the weak adsorbate based on the difference of the equilibrium adsorption amount is selected from the group consisting of an activated carbon, a Na-X type zeolite, a Ca-X type zeolite, a Ca-A type zeolite, and a Li-X type zeolite.

6. A pressure swing adsorption method according to claim 4, wherein the strong adsorbate to the adsorbent is xenon or krypton, and the weak adsorbate to the adsorbent is gas containing one of oxygen, nitrogen, and argon.

7. A pressure swing adsorption method according to claim 1, wherein the adsorbent is an adsorbent which separates the strong adsorbate and the weak adsorbate based on a difference of an adsorption speed.

8. A pressure swing adsorption method according to claim 7, wherein a fine pore diameter of the adsorbent which separates the strong adsorbate and the weak adsorbate based on the difference of the adsorption speed is about 0.4 nm.

9. A pressure swing adsorption method according to claim 7, wherein the weak adsorbate to the adsorbent is xenon or krypton, and the strong adsorbate to the adsorbent is gas containing one of oxygen, nitrogen, and argon.

10. A pressure swing adsorption method in which a mixture gas containing at least two main components is used as a material gas, an adsorbent which easily adsorbs at least one main component in the material gas and does not readily adsorb at least another main component in the material gas is used, the method uses a separation apparatus comprising a lower column and a upper column which are filled with the adsorbent, a material gas storage tank for storing the material gas to be introduced into the lower column, a strong adsorbate low pressure storage tank for storing the strong adsorbate from the lower column, a compressor for pressurizing gas from the material gas storage tank or the strong adsorbate low pressure storage tank and introducing into the lower column, a strong adsorbate high pressure storage tank for storing the strong adsorbate from the lower column, and a weak adsorbate storage tank for storing the weak adsorbate from the upper column, and the strong adsorbate which is easily adsorbed by the adsorbent and the weak adsorbate which is not readily adsorbed by the adsorbent are recovered, wherein the method comprises:
a step (a') in which gas in the material gas storage tank is pressurized by the compressor and introduced into the lower column, the strong adsorbate in the material gas is adsorbed by the adsorbent, gas from the lower column which contains a less amount of the strong adsorbate is introduced into the upper column, the strong adsorbate contained in the gas is adsorbed by the adsorbent in the upper column, and the weak adsorbate which flows from the upper column is recovered in the weak adsorbate storage tank;

a step (b'+i') in which gas from the strong adsorbate low pressure storage tank is pressurized and introduced into the lower column, the weak adsorbate co-adsorbed by the adsorbent in the lower column and the weak adsorbate remaining in space among the adsorbent are introduced into the upper column, the strong adsorbate contained in gas which flows from the lower column is adsorbed by the adsorbent in the upper column, the weak adsorbate flows from the upper column, the weak adsorbate which flows is introduced into the upper column after finishing a step (e'), which is explained below, to depressurize the lower column and the upper column after finishing the step (b'+i');

a step (c') in which the lower column is depressurized, the strong adsorbate adsorbed by the adsorbent filled in the lower column is desorbed, and the strong adsorbate desorbed is recovered in the strong adsorbate high pressure storage tank, and the strong adsorbate is further desorbed and recovered in the strong adsorbate low pressure storage tank;

a step (d') in which the upper column is depressurized, gas adsorbed by the adsorbent in the upper column is desorbed, the desorbed gas is introduced into the lower column, and gas which flows from the lower column is recovered in the material gas storage tank; and a step (e') in which the weak adsorbate recovered in the step (a') is introduced into the upper column as a counter current purge gas, the strong adsorbate adsorbed by the adsorbent in the upper column is displaced and desorbed, gas which flows from the upper column is introduced into the lower column, the strong adsorbate adsorbed by the adsorbent in the lower column is displaced and desorbed by the gas introduced into the lower column, and gas which flows from the lower column is recovered in the material gas storage tank; and a step (j') in which the weak adsorbate introduced in the step (b'+i') is introduced into the upper column to pressurize the upper column and the lower column after finishing the step (e') and these steps (a'), (b'+i'), (c'), (d'), (e'), and (j') are sequentially repeated based on a predetermined sequence, and the strong adsorbate and the weak adsorbate in the material gas are simultaneously recovered in a high concentration with a high recovery percentage.

11. A pressure swing adsorption method according to claim 10, wherein the time of the step (b'+i') or the step (j') is in a range from 10 to 50% relative to a cycle time.

* * * * *